US010241248B2

(12) United States Patent
Yoshimura et al.

(10) Patent No.: US 10,241,248 B2
(45) Date of Patent: Mar. 26, 2019

(54) BIAXIALLY STRETCHED LAMINATED POLYESTER FILM, INFRARED LIGHT SHIELDING STRUCTURE FOR LAMINATED GLASS COMPOSED OF THE SAME, AND LAMINATED GLASS COMPOSED OF THE SAME

(71) Applicant: Teijin Dupont Films Japan Limited, Chiyoda-ku, Tokyo (JP)

(72) Inventors: Tomoka Yoshimura, Anpachi-gun (JP); Taro Oya, Anpachi-gun (JP); Mitsumasa Ono, Anpachi-gun (JP); Tetsuo Yoshida, Anpachi-gun (JP)

(73) Assignee: Teijin DuPont Films Japan Limited, Tokyo (JP)

( * ) Notice: Subject to any disclaimer, the term of this patent is extended or adjusted under 35 U.S.C. 154(b) by 1 day.

(21) Appl. No.: 14/360,083

(22) PCT Filed: Nov. 28, 2012

(86) PCT No.: PCT/JP2012/080692
§ 371 (c)(1),
(2) Date: May 22, 2014

(87) PCT Pub. No.: WO2013/080987
PCT Pub. Date: Jun. 6, 2013

(65) Prior Publication Data
US 2014/0327958 A1 Nov. 6, 2014

(30) Foreign Application Priority Data

Nov. 29, 2011 (JP) ................................. 2011-260376
Nov. 29, 2011 (JP) ................................. 2011-260377
Mar. 22, 2012 (JP) ................................. 2012-065715
Mar. 30, 2012 (JP) ................................. 2012-080700

(51) Int. Cl.
G02B 5/28 (2006.01)
B32B 7/00 (2006.01)
(Continued)

(52) U.S. Cl.
CPC .............. G02B 5/282 (2013.01); B32B 7/005 (2013.01); B32B 7/02 (2013.01); B32B 7/12 (2013.01); B32B 15/08 (2013.01); B32B 15/09 (2013.01); B32B 17/10678 (2013.01); B32B 27/08 (2013.01); B32B 27/18 (2013.01); B32B 27/306 (2013.01); B32B 27/32 (2013.01); B32B 27/36 (2013.01); B32B 2250/05 (2013.01); B32B 2250/244 (2013.01); B32B 2250/42 (2013.01); B32B 2255/10 (2013.01); B32B 2255/205 (2013.01); B32B 2255/26 (2013.01); B32B 2307/30 (2013.01); B32B 2307/306 (2013.01); B32B 2307/416 (2013.01);
(Continued)

(58) Field of Classification Search
CPC . G02B 5/20; G02B 5/208; G02B 5/26; G02B 5/28; G02B 5/281; G02B 5/282; G02B 5/285; G02B 5/287; B32B 7/005; B32B 7/02; B32B 7/10; B32B 15/04; B32B 15/08; B32B 15/09; B32B 17/10678; B32B 27/06; B32B 27/08; B32B 27/18; B32B 27/306; B32B 27/32; B32B 27/36; B32B 2250/05; B32B 2250/42; B32B 2307/416; B32B 2307/418; B32B 2307/518; B32B 2307/54; B32B 2367/00; B32B 2551/00; B32B 2605/006; Y10T 428/24975; Y10T 428/265; Y10T 428/31616; Y10T 428/3163; Y10T 428/31786; B60J 3/007
See application file for complete search history.

(56) References Cited

U.S. PATENT DOCUMENTS 5,103,337 A 4/1992 Schrenk et al.
6,117,530 A 9/2000 Jonza et al.
(Continued)

FOREIGN PATENT DOCUMENTS

CN 1522199 A 8/2004
CN 1871532 A 11/2006
(Continued)

OTHER PUBLICATIONS

Communication dated Oct. 6, 2014, issued by the European Patent Office in counterpart Application No. 12853614.1.
(Continued)

Primary Examiner — Stephone B Allen
Assistant Examiner — Adam W Booher
(74) Attorney, Agent, or Firm — Sughrue Mion, PLLC

(57) ABSTRACT

Provided are a biaxially stretched laminated polyester film and a laminated glass composed of the same. Specifically, the invention is achieved by a biaxially stretched laminated polyester film including 51 layers or more in total, in which a first layer and a second layer are alternately laminated, wherein a polyester (A) constituting the first layer is polyethylene-2,6-naphthalenedicarboxylate; a polyester (B) constituting the second layer is a polyester containing at least one of an ethylene terephthalate component and an ethylene naphthalene dicarboxylate component; an average reflectance within a wavelength range of 400 to 750 nm is not more than 25%; an average reflectance within a wavelength range of 800 to 1,200 nm is 50% or more; and a Young's modulus of the film at 90° C. is 2,400 MPa or more in at least one direction of the longitudinal direction and the lateral direction of the film.

19 Claims, No Drawings

(51) Int. Cl.
  *B32B 7/02* (2006.01)
  *B32B 7/12* (2006.01)
  *B32B 15/08* (2006.01)
  *B32B 15/09* (2006.01)
  *B32B 17/10* (2006.01)
  *B32B 27/08* (2006.01)
  *B32B 27/18* (2006.01)
  *B32B 27/30* (2006.01)
  *B32B 27/32* (2006.01)
  *B32B 27/36* (2006.01)
  *B60J 3/00* (2006.01)

(52) U.S. Cl.
  CPC ... *B32B 2307/418* (2013.01); *B32B 2307/518* (2013.01); *B32B 2307/54* (2013.01); *B32B 2307/732* (2013.01); *B32B 2367/00* (2013.01); *B32B 2551/00* (2013.01); *B32B 2605/006* (2013.01); *B60J 3/007* (2013.01); *Y10T 428/24975* (2015.01); *Y10T 428/265* (2015.01); *Y10T 428/3163* (2015.04); *Y10T 428/31616* (2015.04); *Y10T 428/31786* (2015.04)

(56) References Cited

U.S. PATENT DOCUMENTS

| | | | |
|---|---|---|---|
| 6,565,982 B1 | 5/2003 | Ouderkirk et al. | |
| 6,677,031 B1 | 1/2004 | Murooka et al. | |
| 6,712,896 B2* | 3/2004 | Ono | G02B 5/208 106/162.1 |
| 6,797,396 B1 | 9/2004 | Liu et al. | |
| 6,926,952 B1 | 8/2005 | Weber et al. | |
| 2003/0189754 A1* | 10/2003 | Sugino | B29C 66/91921 359/485.01 |
| 2004/0069977 A1* | 4/2004 | Oya | G02B 5/282 252/587 |
| 2004/0239827 A1* | 12/2004 | Yamazaki | H01L 27/1214 349/45 |
| 2004/0247879 A1 | 12/2004 | Osada et al. | |
| 2005/0014011 A1 | 1/2005 | Oya | |
| 2007/0273964 A1 | 11/2007 | Oya | |
| 2009/0047529 A1* | 2/2009 | Kawashima | B05D 7/04 428/458 |
| 2009/0081472 A1* | 3/2009 | Watanabe | G02B 1/111 428/457 |
| 2010/0006141 A1* | 1/2010 | Oikawa | B32B 5/26 136/251 |
| 2010/0232018 A1* | 9/2010 | Kobayashi | B32B 7/12 359/488.01 |
| 2010/0291329 A1* | 11/2010 | Di Duca | B29C 45/14811 428/35.2 |
| 2011/0097572 A1 | 4/2011 | Yonekura et al. | |

FOREIGN PATENT DOCUMENTS

| | | |
|---|---|---|
| EP | 1164008 A1 | 12/2001 |
| EP | 1350618 A1 | 10/2003 |
| EP | 1481798 A1 | 12/2004 |
| JP | 04313704 A | 11/1992 |
| JP | 9-506837 A | 7/1997 |
| JP | 11508380 A | 7/1999 |
| JP | 2001-179915 A | 7/2001 |
| JP | 2002-509275 A | 3/2002 |
| JP | 2003-205588 A | 7/2003 |
| JP | 2004-74764 A | 3/2004 |
| JP | 2005186613 A | 7/2005 |
| JP | 2009-298661 A | 12/2009 |
| JP | 2011225445 A | 11/2011 |
| KR | 10-2010-0008011 A | 1/2010 |
| WO | 2005/040868 A1 | 5/2005 |

OTHER PUBLICATIONS

Communication dated Nov. 21, 2014, issued by the European Patent Office in counterpart Application No. 12853614.1.

Modem Plastics Processing and Applications, No. 7, vol. 2, 1995, p. 51-54.

* cited by examiner

BIAXIALLY STRETCHED LAMINATED POLYESTER FILM, INFRARED LIGHT SHIELDING STRUCTURE FOR LAMINATED GLASS COMPOSED OF THE SAME, AND LAMINATED GLASS COMPOSED OF THE SAME

CROSS REFERENCE TO RELATED APPLICATIONS

This application is a National Stage of International Application No. PCT/JP2012/080692 filed Nov. 28, 2012 (claiming priority based on Japanese Patent Application Nos. 2011-260376 filed Nov. 29, 2011, 2011-260377 filed Nov. 29, 2011, 2012-065715 filed Mar. 22, 2012 and 2012-080700 filed Mar. 30, 2012), the contents of which are incorporated herein by reference in their entirety.

TECHNICAL FIELD

The present invention relates to a biaxially stretched laminated polyester film having excellent near-infrared light shielding properties and processability into a laminated glass, an infrared light shielding structure for laminated glass composed of the same, and a laminated glass composed of the same.

BACKGROUND ART

As glasses which are used for windows of vehicles such as automobiles, electric trains, etc. and buildings, a laminated glass having a function to shield heat rays is investigated, and a part thereof has already been put into practical use. In recent years, such a laminated glass gets attention from the viewpoint of energy conservation because it prevents incidence of heat rays.

This laminated glass transmits a visible light of whole rays and selectively reflects or absorbs heat rays. For example, when this is used for a windowpane, in a season in which the sunlight is strong, it can suppress a temperature increase in the interior of a room to be caused due to incidence of heat rays, whereas in a season in which the sunlight is weak, and the heating is used, it can suppress an escape of heat from the interior of a room to the outdoors. For that reason, the use of this laminated glass can greatly enhance the utilization efficiency of energy and is useful for energy conservation.

This laminated glass can be obtained by laminating a heat ray shielding film on a glass.

Patent Literature 1 discloses an optical interference film which reflects an infrared light while transmitting a visible light, comprising multiple alternating layers of at least three kinds of layers each having an optical thickness ranging from 0.09 to 0.45 μm, wherein a refractive index of a polymer of the second layer is intermediate between a refractive index of a polymer of the first layer and a refractive index of a polymer of the third layer. Patent Literature 1 discloses that one of the three layers may be made of polyethylene-2,6-naphthalenedicarboxylate. However, Patent Literature 1 does not investigate a laminated polyester film having a layer structure in which two kinds of layers are alternately laminated, the laminated polyester film being excellent in not only near-infrared light shielding properties but processability into a laminated glass.

Patent Literature 2 describes a birefringent dielectric multilayer film which reflects at least 50% of light in a band having a width of at least 100 nm in a wavelength region of interest. Patent Literature 2 describes that the multilayer film includes alternating layers of a first polymer and a second polymer and may be laminated on a non-planar glass layer and used in vehicular windshields. Meanwhile, in the polymers of the respective layers specifically investigated in Patent Literature 2, the first polymer was a polyester, whereas the second polymer was PMMA.

Patent Literature 3 discloses a transparent multilayer device which reflects an infrared light while transmitting a visible light, comprising a polymer film including a plurality of layers and a transparent conductor having at least one layer containing a metal or a metal compound. In Patent Literature 3, as for the case of mirrors, namely, combinations of the multilayer films obtained by stretching in two directions within the film plane, there are exemplified PEN/Ecdel (a trade name for thermoplastic elastomer), PEN/sPS, PEN/copolymerized PET, and the like. Patent Literature 3 describes that the transparent multilayer device may be used in windshields for automobiles or the like, or windowpanes. However, Patent Literature 3 does not investigate an increase of the processability into a laminated glass.

In addition, Patent Literature 4 discloses a near heat ray shielding film in which a first layer having a melting point ranging from 250 to 260° C. and comprising ethylene terephthalate as a main recurring unit and a second layer having a melting point ranging from 200 to 245° C. and comprising ethylene terephthalate as a main recurring unit are alternately laminated and describes that an interlayer separation phenomenon is inhibited by increasing adhesion between layers by using resins having a composition close to each other in the first layer and the second layer. However, in the resins having a composition close to each other, since a difference in refractive index between the layers is small, the layer number is required to be increased, and it is necessary to take a complicated layer structure in which a first laminated portion and a second laminated portion having a different layer thickness ratio from the first layer and the second layer, respectively are further laminated. In addition, Patent Literature 4 does not investigate an increase of the processability into a laminated glass.

Patent Literature 5 discloses a biaxially stretched polyester film suitable as an intermediate film for a laminated glass with a good appearance, comprising an alternate laminate of two kinds of resins and having excellent glass scattering prevention and crime prevention performance. In Patent Literature 5, for the purpose of increasing the crime prevention performance, the Young's modulus of the film at room temperature is specified. However, Patent Literature 5 is concerned with a polyester film having an excellent crime prevention performance, but it does not make investigations while paying attention to an increase of near-infrared light shielding properties and processability into a laminated glass.

In the light of the above, in the case of an alternate laminate made of polymers of different kinds which has been conventionally investigated, for example, PMMA has a high hardness, and therefore, when processed into a laminated glass, a phenomenon of generation of fine irregularities is not caused. Thus, such was not acknowledged as a problem. However, it has been newly clarified that in the process of proceeding with investigation of films for laminated glass using an alternate laminate made of polyesters each other for the purposes of recycle properties, solving of separation between layers, and so on, when a polyester-based alternate laminate having excellent near-infrared light shielding properties is processed into a laminated glass, fine irregularities are generated on the film surface. Furthermore, it is the present state that a film having increased processability into a laminated glass is demanded.

Patent Literature 1: JP-A-4-313704
Patent Literature 2: JP-A-2011-225445
Patent Literature 3: JP-T-11-508380
Patent Literature 4: WO 2005/040868A
Patent Literature 5: JP-A-2005-186613

DISCLOSURE OF INVENTION

Technical Problem

A problem of the present invention is to provide a biaxially stretched laminated polyester film having not only a high near-infrared shielding performance but excellent processability at the time of processing into a laminated glass, an infrared light shielding structure for laminated glass composed of the same, and a laminated glass composed of the same.

Solution to Problem

In order to solve the above-described problem, the present inventors made extensive and intensive investigations. As a result, it has been found that when the conventional biaxially stretched laminated polyester film having excellent near-infrared light shielding properties reaches a high temperature as 90° C. at which it is processed into a laminated glass, the Young's modulus of the film greatly changes, and at the time of processing into a laminated glass to be carried out by heating under pressure, a surface shape of an opposite material to be laminated is easily transferred, so that the processability into a laminated glass was lowered, leading to the present invention.

Thus, according to the present invention, an object of the present invention is achieved by a biaxially stretched laminated polyester film (Item 1) comprising 51 layers or more in total, in which a first layer and a second layer are alternately laminated, wherein a polyester (A) constituting the first layer is polyethylene-2,6-naphthalenedicarboxylate; a polyester (B) constituting the second layer is a polyester containing at least one of an ethylene terephthalate component and an ethylene naphthalene dicarboxylate component; an average reflectance within a wavelength range of 400 to 750 nm is not more than 25%; an average reflectance within a wavelength range of 800 to 1,200 nm is 50% or more; and a Young's modulus of the film at 90° C. is 2,400 MPa or more in at least one direction of the longitudinal direction and the lateral direction of the film.

In addition, the biaxially stretched laminated polyester film of the present invention includes the following constitutions as preferred embodiments.

Item 2: The biaxially stretched laminated polyester film as set forth in Item 1, having a protective layer composed of a polymer having a glass transition temperature of 90° C. or higher and having a thickness of 5 μM or more and not more than 20 μm on the both sides of a laminated structure portion (I) in which the first layer and the second layer are alternately laminated.

Item 3: The biaxially stretched laminated polyester film as set forth in Item 2, wherein the polyester (B) constituting the second layer is a polyester containing 50% by mole or more and not more than 95% by mole of an ethylene terephthalate component on the basis of the whole recurring units.

Item 4: The biaxially stretched laminated polyester film as set forth in Item 2 or 3, wherein the polyester (B) constituting the second layer is copolymerized polyethylene terephthalate having a glass transition temperature of lower than 90° C.

Item 5: The biaxially stretched laminated polyester film as set forth in Item 1, wherein the biaxially stretched laminated polyester film is composed of only a laminated structure portion (I) in which the first layer and the second layer are alternately laminated; or is a film in which a protective layer having a thickness of less than 5 μm is provided on the both sides thereof, the polyester (B) constituting the second layer is composed of a polyester having a glass transition temperature of lower than 90° C., and a Young's modulus of the film at 20° C. is 5,000 MPa or more in at least one direction of the longitudinal direction and the lateral direction of the film.

Item 6: The biaxially stretched laminated polyester film as set forth in Item 1 or 2, wherein the polyester (B) constituting the second layer is a polyester having a glass transition temperature of 90° C. or higher.

Item 7: The biaxially stretched laminated polyester film as set forth in Item 6, wherein the polyester (B) constituting the second layer is a polyester containing 30% by mole or more and not more than 90% by mole of an ethylene naphthalene dicarboxylate component on the basis of the whole recurring units.

Item 8: The biaxially stretched laminated polyester film as set forth in any one of Items 1 to 7, wherein the polyester (A) constituting the first layer is polyethylene-2,6-naphthalenedicarboxylate having a copolymerization amount of not more than 8% by mole on the basis of the whole recurring units.

Item 9: The biaxially stretched laminated polyester film as set forth in any one of Items 1 to 8, having at least one layer containing an ultraviolet light absorber.

Item 10: The biaxially stretched laminated polyester film as set forth in Item 9, wherein the ultraviolet light absorber has an extinction coefficient ε at a wavelength of 380 nm of 2 or more.

Item 11: The biaxially stretched laminated polyester film as set forth in Item 9 or 10, wherein an average light transmittance within a wavelength range of 300 nm or more and less than 400 nm is not more than 10%.

Item 12: The biaxially stretched laminated polyester film as set forth in any one of Items 1 to 11, which is used for shielding of heat rays.

Item 13: The biaxially stretched laminated polyester film as set forth in any one of Items 1 to 12, which is used for laminated glass.

Item 14: The biaxially stretched laminated polyester film as set forth in any one of Items 1 to 13, wherein a coating layer having a refractive index of 1.60 to 1.63 and a thickness of 0.05 to 0.2 μm is provided on at least one surface of the biaxially stretched laminated polyester film having the laminated structure portion (I).

In addition, the present invention also includes an infrared light shielding structure for laminated glass comprising the biaxially stretched laminated polyester film of the present invention having a laminate of a metal and/or a metal oxide laminated on one surface thereof, wherein in the biaxially stretched laminated polyester film, a thickness of the protective layer on the side coming into contact with the laminate of a metal and/or a metal oxide is 5 μm or more and not more than 20 μm; the laminate of a metal and/or a metal oxide has a laminated structure (II) in which a low-refractive index layer and a high-refractive index layer are alternately laminated; and the infrared light shielding structure for laminated glass has an average reflectance in a wavelength range of 400 to 750 nm of not more than 30%, an average reflectance in a wavelength range of 800 to 1,200 nm of 50% or more, and an average reflectance in a wavelength range of 1,200 to 2,100 nm of 50% or more.

Furthermore, the present invention also includes a laminated glass comprising two glass sheets having the biaxially stretched laminated polyester film of the present invention sandwiched therebetween via a resin layer composed of at least one member selected from an ethylene-vinyl acetate copolymer, polyvinyl butyral, and an ionomer resin.

Furthermore, a laminated glass comprising two glass sheets having the infrared light shielding structure for laminated glass of the present invention sandwiched therebetween via a resin layer composed of at least one member selected from an ethylene-vinyl acetate copolymer, polyvinyl butyral, and an ionomer resin is also included as one embodiment of the present invention.

Advantageous Effects of Invention

According to the present invention, a biaxially stretched laminated polyester film having both a high near-infrared shielding performance and excellent processability into a laminated glass is provided, and by using the biaxially stretched laminated polyester film of the present invention, when processed into a laminated glass, a laminated glass having an excellent appearance such that fine irregularities are not generated and having an excellent near-infrared shielding performance can be provided.

BEST MODE FOR CARRYING OUT THE INVENTION

First Layer

In the present invention, the polyester (A) constituting the first layer is polyethylene-2,6-naphthalenedicarboxylate.

A proportion of the ethylene-2,6-naphthalenedicarboxylate component in the polyester (A) is preferably 95% by mole or more and not more than 100% by mole, more preferably 96% by mole or more, and still more preferably 97% by mole or more on the basis of the whole recurring units constituting the polyester (A). When the proportion of the ethylene-2,6-naphthalenedicarboxylate component that is a main component is less than the lower limit, the melting point of the polyester (A) constituting the first layer is lowered, and a difference in melting point from the polyester (B) constituting the second layer as described layer is hardly obtained. As a result, there is a concern that a sufficient difference in refractive index is hardly imparted to the biaxially stretched laminated polyester film.

As other copolymerization components than the main component constituting the polyester (A), there are preferably exemplified acid components such as aromatic carboxylic acids, for example, isophthalic acid, terephthalic acid, orthophthalic acid, a naphthalenedicarboxylic acid other than 2,6-naphthalenedicarboxylic acid, biphenyldicarboxylic acid, etc.; aliphatic dicarboxylic acids, for example, succinic acid, adipic acid, azelaic acid, sebacic acid, decanedicarboxylic acid, etc.; alicyclic dicarboxylic acids, for example, cyclohexanedicarboxylic acid, etc., and the like, as well as glycol components such as aliphatic diols, for example, diethylene glycol, propylene glycol, 1,4-butanediol, 1,5-pentanediol, 1,6-hexanediol, neopentyl glycol, etc.; alicyclic diols, for example, 1,4-cyclohexanedimethanol; polyethylene glycol, polytetramethylene glycol, and the like.

Of these copolymerization components, at least one member selected from the group consisting of isophthalic acid, terephthalic acid, neopentyl glycol, 1,4-cyclohexanedimethanol, and diethylene glycol is preferable. Of these copolymerization components, isophthalic acid and terephthalic acid are especially preferable. These copolymerization components may be used solely, or two or more components thereof can also be used.

The polyester (A) can be produced by applying a known method. For example, the polyester (A) can be produced by a method in which the diol component and the dicarboxylic acid component as the main components and optionally the copolymerization component are subjected to an esterification reaction, and subsequently, the obtained reaction product is subjected to a polycondensation reaction to form a polyester. In addition, the polyester (A) may also be produced by a method in which derivatives of these raw material monomers are subjected to an ester interchange reaction, and subsequently, the obtained reaction product is subjected to a polycondensation reaction to form a polyester. Furthermore, the polyester (A) may also be obtained by a method in which two or more kinds of polyesters are used and melt kneaded within an extruder to achieve an ester interchange reaction (redistribution reaction).

An intrinsic viscosity of the polyester (A) constituting the first layer is in the range of preferably 0.40 to 0.80 dL/g, and more preferably 0.45 to 0.75 dL/g. In the case where the intrinsic viscosity of the polyester (A) constituting the first layer falls outside the foregoing range, there is a concern that a difference in intrinsic viscosity from the polyester (B) constituting the second layer becomes large. As a result, in the case of forming an alternately laminated structure, there is a concern that the layer structure is disordered, or though the film formation can be achieved, the film forming properties are lowered. In the case of obtaining the polyester (A) by using two or more kinds of polyesters and melt kneading them within an extruder to achieve an ester interchange reaction, the intrinsic viscosity of each of the polyesters may fall within the foregoing range.

A melting point of the polyester (A) constituting the first layer is preferably higher by 10° C. or more, more preferably higher by 15° C. or more, still more preferably higher by 18° C. or more, and especially preferably higher by 20° C. or more than a melting point of the polyester (B) constituting the second layer as described later. When the difference in melting point between the polyesters of the both layers is less than the foregoing range, there is a concern that it is difficult to impart a sufficient difference in refractive index to the obtained laminated polyester film. As a result, there is a concern that reflectance properties in a near-infrared wavelength region are not obtained.

In addition, a glass transition temperature of the polyester (A) constituting the first layer is preferably higher than a glass transition temperature of the polyester (B) constituting the second layer.

The first layer of the present invention may contain a small amount of an additive within the range where the object of the present invention is not impaired. Examples thereof include additives such as a lubricant, for example, an inactive particle, etc., a coloring agent, for example, a pigment, a dye, etc., a stabilizer, a flame retarder, a foaming agent, and the like. Examples of the lubricant particle include inorganic particles such as silica, alumina, titanium oxide, calcium carbonate, kaolin, etc., and organic particles such as a deposited particle of catalyst residue, silicone, a polystyrene crosslinked material, an acrylic crosslinked material, etc.

Second Layer

In the present invention, the polyester (B) constituting the second layer is a polymer containing at least one of an ethylene terephthalate component and an ethylene naphthalene dicarboxylate component.

In addition, a constitution having a protective layer composed of a polymer having a glass transition temperature of 90° C. or higher and having a thickness of 5 μm or more and not more than 20 μm on the both sides of the laminated structure portion (I) in which the first layer and the second layer are alternately laminated is exemplified as one preferred embodiment of the polyester film of the present invention. In the case of such a constitution, examples of the polyester (B) constituting the second layer include (B-i) a polyester containing 50% or more and not more than 95% by mole of an ethylene terephthalate component on the basis of the whole recurring units constituting the polyester of the second layer, and/or copolymerized polyethylene terephthalate having a glass transition temperature of lower than 90° C.

Even in the case of using, as the polymer of the second layer, the above-described copolymerized polyester (B-i) having such a characteristic feature that a difference in refractive index from the first layer is large, and even if the lamination number is decreased, a near-infrared light reflecting performance is easily imparted, whereas at the time of processing into a laminated glass, the film is easily softened, in view of the fact that the film has a protective layer having such a characteristic feature, the strength of the protective layer is kept under a processing condition at the time of processing into a laminated glass. As a result, flatness of the film can be kept, and a laminated glass with a favorable appearance such that the generation of fine irregularities is not perceived can be obtained.

In addition, in the case where the polyester film of the present invention is composed of only a laminated structure portion (I) in which the first layer and the second layer are alternately laminated, or has a protective layer having a thickness of less than 5 μm on the both sides thereof, there is exemplified an embodiment in which the polyester (B) constituting the second layer in the present invention is composed of (B-ii) a polyester having a glass transition temperature of lower than 90° C., and a Young's modulus of the film at 20° C. is 5,000 MPa or more in at least one direction of the longitudinal direction and the lateral direction of the film.

Even when the polyester constituting the second layer has a glass transition temperature of lower than 90° C. and tends to be softened at the time of processing into a laminated glass, by simultaneously increasing an area magnification of the stretching to sufficiently achieve oriented crystallization of the first layer, a degree of oriented crystallization of the first layer is increased, and the Young's modulus of the film at 20° C. is made to fall within such a region, whereby the Young's modulus properties of the present invention at a temperature of 90° C. can be obtained.

As other example of the polyester (B) constituting the second layer, it may be (B-iii) a polyester having a glass transition temperature of 90° C. or higher, and more preferably, the above-described polyester having a glass transition temperature of 90° C. or higher may also be a polyester containing 30% by mole or more and not more than 90% by mole of an ethylene naphthalene dicarboxylate component on the basis of the whole recurring units. In the case of using a polyester having a glass transition temperature of 90° C. or higher as the polyester (B) constituting the second layer, the Young's modulus properties of the present invention at a temperature of 90° C. can be obtained without relying upon the properties and the presence or absence of the protective layer as the outermost layer, when processed into a laminated glass, flatness of the film is kept, and a favorable appearance which is free from the generation of fine irregularities can be obtained.

The polyester (B) constituting the second layer is hereunder described for every preferred embodiment.

Embodiment of (B-i)

As an example of the polyester of the second layer in the present invention, there is exemplified a polyester containing 50% by mole or more and not more than 95% by mole of an ethylene terephthalate component, and more preferably copolymerized polyethylene terephthalate having 60% by mole or more and not more than 90% by mole of an ethylene terephthalate component (namely, the copolymerization component is copolymerized in an amount of preferably 5 to 50% by mole, and more preferably 10 to 40% by mole) on the basis of the whole recurring units constituting the polyester of the second layer.

In the case where the copolymerization amount is less than the lower limit, at the time of film formation, crystallization and orientation are easy to occur, so that a difference in refractive index from the first layer is hardly revealed, and the near-infrared light reflecting ability is easily lowered. On the other hand, in the case where the copolymerization amount exceeds the upper limit, at the time of film formation (in particular, at the time of extrusion), the heat resistance or film forming properties are easily lowered, and in the case where the copolymerization component is a component that imparts high refractive index properties, a difference in refractive index from the first layer is easy to become small due to an increase of the refractive index. When the copolymerization amount falls within the foregoing range, the difference in refractive index from the first layer can be sufficiently ensured while keeping favorable heat resistance and film forming properties, and a sufficient near-infrared light reflecting performance can be imparted.

Incidentally, for the purposes of ensuring the difference in refractive index from the first layer and increasing the reflectance, it is preferable to control a heat set temperature at the time of film formation as described later to the melting point or higher of the polyester (B-i), thereby melting the polyester (B-i) of the second layer while maintaining the orientation of the first layer. After stretching, by melting only the second layer to lower the orientation of the second layer, the difference in refractive index between the first layer and the second layer can be made larger. In order to melt only the polyester (B-i) by the heat set treatment, the melting point of the polyester (B-i) is preferably lower by 10° C. or more, and more preferably lower by 30° C. or more than the melting point of the above-described polyester (A).

Examples of the copolymerization component which is preferably used for the polyester (B-i) include acid components such as aromatic dicarboxylic acids, for example, isophthalic acid, 2,6-naphthalenedicarboxylic acid, 2,7-naphthalenedicarboxylic acid, etc.; aliphatic dicarboxylic acids, for example, adipic acid, azelaic acid, sebacic acid, decanedicarboxylic acid, etc.; alicyclic dicarboxylic acids, for example, cyclohexanedicarboxylic acid; and the like, as well as glycol components such as aliphatic diols, for example, butanediol, hexanediol, etc.; alicyclic diols, for example, cyclohexanedimethanol; spiro glycol; and the like. Above all, isophthalic acid, 2,6-naphthalenedicarboxylic acid, cyclohexanedimethanol, and spiro glycol are preferable. In the case of containing other copolymerization component than the foregoing, a copolymerization amount thereof is preferably not more than 10% by mole.

In addition, the glass transition temperature of the polyester (B-i) is preferably not higher than 90° C. By using such a polyester, in the case of stretching under a stretching condition under which the polyester (A) of the first layer is oriented, the stretching temperature is too high for the polyester (B-i) of the second layer, and hence, the orientation does not proceed, and the difference in refractive index between the first layer and the second layer is easily revealed.

The second layer in the present invention may be either amorphous or crystalline. Here, the term "amorphous" refers to the matter that when the biaxially stretched laminated polyester film is subjected to DSC measurement at a temperature rise rate of 20° C./min, the melting point derived from the second layer is not observed. In addition, the term "crystalline" refers to the matter that the melting point derived from the second layer is observed in the above-described DSC measurement.

In the case where the polyester of the second layer is the embodiment of (B-i), it is preferable that a protective layer composed of a polymer having a glass transition temperature of 90° C. or higher and having a thickness of 5 or more and not more than 20 μm is provided on the both sides of the laminated structure portion (I) in which the first layer and the second layer are alternately laminated. By providing the protective layer having such a characteristic feature, even in the case where a polymer which is easily softened at the time of processing into a laminated glass is used for the second layer, the strength of the protective layer is kept under a processing condition at the time of processing into a laminated glass. As a result, flatness of the film can be kept, and a laminated glass with a favorable appearance such that the generation of fine irregularities is not perceived can be obtained.

Embodiment of (B-ii)

In addition, in the case where the polyester film of the present invention is composed of only a laminated structure portion (I) in which the first layer and the second layer are alternately laminated, or has a protective layer having a thickness of less than 5 μm on the both sides thereof, there is exemplified an embodiment in which the polyester (B) constituting the second layer in the present invention is composed of (B-ii) a polyester having a glass transition temperature of lower than 90° C., and a Young's modulus of the film at 20° C. is 5,000 MPa or more in at least one direction of the longitudinal direction and the lateral direction of the film.

Even when the polyester constituting the second layer has a glass transition temperature of lower than 90° C. and tends to be softened at the time of processing into a laminated glass, by simultaneously increasing an area magnification of the stretching to sufficiently achieve oriented crystallization of the first layer, a degree of oriented crystallization of the first layer is increased, and the Young's modulus of the film at 20° C. is made to fall within such a region, whereby the Young's modulus properties of the present invention at a temperature of 90° C. can be obtained. As a result, it becomes possible to keep smoothness of the film at the time of processing into a laminated glass, fine irregularities, wrinkles, or the like are hardly generated in the film, and excellent processability into a laminated glass is revealed.

As an example of the polyester (B-ii) having such a glass transition temperature, there is exemplified copolymerized polyethylene terephthalate containing 50% by mole or more and not more than 97% by mole of an ethylene terephthalate component on the basis of the whole recurring units constituting the polyester of the second layer and composed of 3 to 50% by mole of other copolymerization component. In addition, it is more preferable to contain 75 to 97% by mole of the ethylene terephthalate component (the proportion of other copolymerization component is 3 to 25% by mole).

When the proportion of the ethylene terephthalate component is less than the lower limit, the film forming properties are easily lowered at the time of stretching, whereas when the proportion of the ethylene terephthalate component exceeds the upper limit, there is a concern that a difference in refractive index from the polyester constituting the first layer is hardly revealed, and it is difficult to impart a sufficient reflectance to the film.

As the copolymerization component other than the ethylene terephthalate component of the polyester (B-ii), one properly selected among the copolymerization components described for the polyester (B-i) can be used.

Embodiment of (B-iii)

As other embodiment of the polyester (B) constituting the second layer in the present invention, there is exemplified a polyester having a glass transition temperature of 90° C. or higher, more preferably 95° C. or higher, and especially preferably 100° C. or higher.

In view of the fact that the polyester constituting the second layer has such a glass transition temperature, the Young's modulus properties of the present invention can be obtained under a temperature condition of 90° C. without relying upon the properties and the presence or absence of the protective layer as the outermost layer, and in a process of processing into a laminated glass, fine irregularities, wrinkles, or the like by means of softening of the polyester film are hardly generated. As a result, smoothness of the film at the time of processing into a laminated glass can be kept, and excellent processability into a laminated glass is revealed.

As the polyester having such a glass transition temperature, specifically, there is exemplified a polyester containing 30% by mole or more and not more than 90% by mole of an ethylene naphthalene dicarboxylate component on the basis of the whole recurring units constituting the polyester of the second layer.

The lower limit of the proportion of the ethylene naphthalene dicarboxylate component is more preferably 45% by mole, still more preferably 50% by mole, and especially preferably 55% by mole. In addition, the upper limit of the proportion of the ethylene naphthalene dicarboxylate component is more preferably 85% by mole, and especially preferably 80% by mole. When the proportion of the ethylene naphthalene dicarboxylate component is the lower limit or more, the polyester has a glass transition temperature of 90° C. or higher. In the case where the proportion of the ethylene naphthalene dicarboxylate component exceeds the upper limit, there is a concern that a difference in refractive index from the refractive index of the first layer is hardly obtained, and it is difficult to obtain sufficient reflectance properties.

As the copolymerization component other than the ethylene naphthalate dicarboxylate constituting the polyester having such a glass transition temperature, there can be preferably exemplified acid components such as aromatic carboxylic acids, for example, isophthalic acid, terephthalic acid, orthophthalic acid, biphenyldicarboxylic acid, etc.; aliphatic dicarboxylic acids, for example, succinic acid, adipic acid, azelaic acid, sebacic acid, decanedicarboxylic acid, etc.; and alicyclic dicarboxylic acids, for example, cyclohexanedicarboxylic acid, etc., as well as glycol components such as aliphatic diols, for example, diethylene glycol, propylene glycol, 1,4-butanediol, 1,5-pentanediol, 1,6-hexanediol, neopentyl glycol, etc.; alicyclic diols, for example, 1,4-cyclohexanedimethanol, etc.; polyethylene glycol, polytetramethylene glycol, and the like. In addition, 2,7-naphthalenedicarboxylic acid or 1,5-naphthalenedicarboxylic acid may also be used as a secondary copolymerization component. Of these copolymerization components, terephthalic acid and isophthalic acid are preferable, and terephthalic acid is especially preferable.

Though the upper limit of the glass transition temperature of the above-described polyester (B-iii) is naturally determined depending upon the exemplified polyester component and is not particularly limited, it tends to become lower than the glass transition temperature of the polyester of the first layer.

(Properties of Polyester (B))

An intrinsic viscosity of the polyester (B) constituting the second layer is in the range of preferably 0.4 to 1.0 dL/g, more preferably 0.45 to 0.95 dL/g, and still more preferably 0.5 to 0.95 dL/g. In the case where the intrinsic viscosity of the polyester (B) constituting the second layer falls outside the foregoing range, there is a concern that a difference in intrinsic viscosity from the polyester (A) constituting the first layer becomes large. As a result, in the case of forming an alternate laminated structure, there is a concern that the layer structure is disordered, or though the film formation can be achieved, the film forming properties are lowered.

In the case of obtaining the polyester (B) by using two or more kinds of polyesters and melt kneading them within an extruder to achieve an ester interchange reaction, the intrinsic viscosity of each of the polyesters may fall within the foregoing range.

In addition, in the case where the intrinsic viscosity is further increased within the forgoing range, a haze value of the film can be made small. Specifically, so far as the intrinsic viscosity of the polyester (B) constituting the second layer is in the range of 0.75 to 0.95 dL/g, an effect for making the haze value small is easily revealed.

In addition when the polyester (B) constituting the second layer is amorphous, the haze value can be made smaller. The range of the copolymerization amount at which the polyester (B) is amorphous varies with the kind of the copolymerization component, and for example, in the case where the copolymerization component of copolymerized PET is isophthalic acid or a naphthalenedicarboxylic acid, the copolymerization amount is approximately 30% by mole or more.

The polyester (B) in the present invention can be produced by applying a known method. For example, the polyester (B) can be produced by a method in which the acid component and the glycol component as the main components and optionally the copolymerization component are subjected to an esterification reaction, and subsequently, the obtained reaction product is subjected to a polycondensation reaction to form the polyester. In addition, the polyester (B) may also be produced by a method in which derivatives of these raw material monomers are subjected to an ester interchange reaction, and subsequently, the obtained reaction product is subjected to a polycondensation reaction to form a polyester. Furthermore, the polyester (B) may also be obtained by a method in which two or more kinds of polyesters are used and melt kneaded within an extruder to achieve an ester interchange reaction (redistribution reaction).

The second layer of the present invention may contain a small amount of an additive within the range where the object of the present invention is not impaired. Examples thereof include additives such as a lubricant, for example, an inactive particle, etc., a coloring agent, for example, a pigment, a dye, etc., a stabilizer, a flame retarder, a foaming agent, and the like. Examples of the lubricant particle include inorganic particles such as silica, alumina, titanium oxide, calcium carbonate, kaolin, etc., and organic particles such as a deposited particle of catalyst residue, silicone, a polystyrene crosslinked material, an acrylic crosslinked material, etc.

[Laminated Structure]

The biaxially stretched laminated polyester film of the present invention is a laminated film comprising 51 layers or more in total, in which the above-described first layer and second layer are alternately laminated. By adopting such a lamination number, the selective reflection by multiple interference can be made large, and a sufficient reflectance can be obtained. In addition, it is preferable that the lamination number is larger because the reflectance properties in a near-infrared wavelength region more increase. From the viewpoint of productivity, an upper limit of the lamination number is preferably not more than 900 layers. In addition, the lower limit of the lamination number is more preferably 101 layers, and still more preferably 150 layers. When the layer number is less than the lower limit, the selective reflection by multiple interference is small, and a sufficient near-infrared reflecting performance is not obtained.

[Layer Thickness]

The thickness of each of the first layer and the second layer in the present invention is preferably a thickness at which an effect for selectively reflecting a near-infrared light by optical interference between layers.

Here, the reflection wavelength of the laminated film is corresponding to two times of a total of optical thicknesses of the first layer and the second layer adjacent to each other. Such an optical thickness is expressed by the product of the refractive index and the thickness of each layer, and it is preferable to adjust the thickness of each layer by the refractive index of the resin to be used and the desired reflection wavelength.

In addition, as described in Radford et al., *Reflectivity of Iridescent Coextruded Multilayered Plastic Films and Polymer Engineering and Science*, Vol. 13, No. 3 (May 1973), in multilayer films utilizing multiple interference by a quarter wavelength, even in the case where a main reflection peak is not generated in a visible light region, when a higher order reflection peak is generated in a visible light region, coloration by higher-order reflection may be possibly exhibited. Therefore, it is preferable to adopt an appropriate optical thickness for the purpose of eliminating the higher-order reflection.

In multilayer interference films, in the case where a ratio of the optical thickness of the second layer to the optical thickness of the first layer of the main reflection peak is 1.0, among higher-order peaks, a second-order peak (one-half wavelength of the main reflection peak) and a fourth-order peak (quarter wavelength of the main reflection peak) can be removed.

As an example in which an appropriate optical thickness for eliminating the higher-order reflection is taken into consideration, in the case where polyethylene-2,6-naphthalenedicarboxylate (hereinafter referred to as "PEN") is used for the first layer, copolymerized polyethylene terephthalate having 12% by mole of isophthalic acid copolymerized therewith (hereinafter referred to as "IA12PET") is used for the second layer, and a wavelength of 800 to 1,200 nm is subjected to primary reflection, the thickness of each layer is described. In general, a refractive index of PEN in the stretching direction is 1.74 to 1.78, and a refractive index of IA12PET in the stretching direction is about 1.58 to 1.65, values of which are, however, variable depending upon the film forming conditions of the film, and hence, the thickness of each layer of the first layer is preferably in the range of 0.1 μm or more and not more than 0.2 μl. In an example of the combination of PEN and IA12PET, when each layer of the first layer has a thickness of this range, it is possible to selectively reflect and shield the light in a near-infrared region.

In the range where the thickness of the first layer is thinner than the lower limit, the reflected light is in a visible light region, so that there is a concern that the film is colored to lower the visibility. On the other hand, when the thickness of the first layer exceeds the upper limit, a third order peak (one-third of the main reflection peak) is generated in a visible light region by optical interference between layers, and therefore, there is a concern that coloration is caused, so that the transparency is impaired.

In addition, in an example of the combination of PEN and IA12PET, in order to obtain an effect for selectively reflecting a near-infrared light by optical interference between layers, the thickness of each layer of the second layer is preferably in the range of 0.09 μm or more and not more than 0.22 μm, and more preferably 0.10 μm or more and not more than 0.20 μm. When each layer of the second layer has a thickness of this range, it is possible to selectively reflect and shield the light in a near-infrared region. In the range where the thickness of the second layer is thinner than the lower limit, the reflected light is in a visible light region, so that there is a concern that the film is colored to lower the visibility. On the other hand, when the thickness of the second layer exceeds the upper limit, a third-order peak is generated in a visible light region by optical interference between layers, and therefore, there is a concern that coloration is caused, so that the transparency is impaired.

In the case of the laminated polyester film of the present invention, by taking the relation of optical thicknesses and the refractive index of each layer as described above into consideration and more increasing the combination such that a ratio (thickness ratio) of the thickness of the second layer to the thickness of the first layer adjacent to each other falls within the range of 0.9 to 1.1, it is possible to decrease higher-order peaks generated in the visible light region, and it is also possible to make the average reflectance in the visible light region smaller.

This relation may be enough to be satisfied in the majority of the layers of the laminated film and may be enough to be satisfied in 70% or more, preferably 80% or more, more preferably 90% or more, and especially preferably 95% or more of the total layer number of the laminated structure portion.

As for the thickness of each layer, in order to enhance the reflectance in a wavelength region of 800 to 1,200 nm, it is preferable to continuously change a ratio of the maximum thickness to the minimum thickness (maximum/minimum) in the first layer between 1.2 and 1.8.

In addition, as for the thickness of each layer of the second layer, in order to enhance the reflectance in a wavelength region of 800 to 1,200 nm, it is preferable to continuously change a ratio of the maximum thickness to the minimum thickness (maximum/minimum) between 1.2 and 1.6.

[Protective Layer]

It is preferable that the biaxially stretched laminated polyester film of the present invention has a protective layer composed of a polymer having a glass transition temperature of 90° C. or higher, and preferably 110° C. or higher and having a thickness of 5 μm or more and not more than 20 μm, preferably 7 μm or more and not more than 15 μm, and more preferably 7 μm or more and not more than 13 μm on the both sides of the laminated structure portion thereof. According to this, the strength of the protective layer is kept even under a processing temperature condition at the time of processing into a laminated glass, and the 90° C. Young's modulus properties of the present invention can be obtained. As a result, flatness of the film is kept at the time of processing into a laminated glass, and a laminated glass with a favorable appearance such that the generation of fine irregularities is not perceived is obtained.

In the case where the glass transition temperature of the polymer of the protective layer is lower than 90° C., or in the case where the thickness of the protective layer is less than 5 μm, there is a concern that when processed into a laminated glass, the effect for inhibiting fine irregularities is decreased depending upon the polyester constitution of the second layer.

Meanwhile, in the case where the thickness of the protective layer exceeds 20 μm, there is a concern that not only the effect for inhibiting the generation of fine irregularities does not change from that in the case where the thickness of the protective layer is thinner than the former, but when molded into a curved laminated glass, the follow-up properties toward the curved proportion are lowered.

Examples of the polymer having a glass transition temperature of 90° C. or higher, which is preferably used for the protective layer, include polyethylene naphthalate, polycarbonate, polystyrene, polymethyl methacrylate, polyphenylene sulfide, polyether sulfone, polyphenylene oxide, and the like. As for a method of laminating the protective layer, the laminated structure portion and the protective layer may be simultaneously fabricated by means of co-extrusion, or only the protective layer may be stuck later. Above all, it is preferable that polyethylene-2,6-naphthalate that is a polymer of the first layer is used for the protective layer, and the protective layer and the laminated structure portion are simultaneously fabricated by a co-extrusion method.

Incidentally, in the case where the polyester of the second layer is the embodiment of (B-ii) or (B-iii), even when such a structure of the protective layer is not adopted, the object of the present invention can be achieved. As for the structure other than the above-described protective layer, specifically, the protective layer may not be used, or the protective layer may be one having a thickness of less than 5 μm.

[Difference in Refractive Index]

A difference in refractive index between the first layer and the second layer is preferably 0.09 or more, more preferably 0.11 or more, and still more preferably 0.13 or more in all of the longitudinal direction (longer direction, film forming direction, or MD direction) and the lateral direction (width direction, perpendicular direction to the film forming direction, or TD direction). When the difference in refractive index falls within such a range, the reflection properties can be efficiently increased, and therefore, a high reflectance can be obtained in a smaller lamination number.

In the biaxially stretched laminated polyester film of the present invention, the above-described polyester is adopted for the first layer and the second layer, and therefore, the above-described difference in refractive index can be easily attained by choosing a film forming condition (stretching condition or heat set condition) as described later.

[Reflectance Properties]

The biaxially stretched laminated polyester film of the present invention has not only an average reflectance of not more than 25% within a wavelength range of 400 to 750 nm but an average reflectance of 50% or more within a wavelength range of 800 to 1,200 nm.

In view of the facts that the average reflectance in a visible light wavelength region is low, the transmittance in such a wavelength region is high, and at the same time, the average reflectance in a near-infrared wavelength region is high, for example, when used as a near-infrared light shielding film of a laminated glass for a window such as a building window, an automotive window, etc., it is possible to achieve high visibility and high transparency and also to efficiently increase a near-infrared light shielding performance.

The average reflectance within a wavelength region of 400 to 750 nm is more preferably not more than 20%. In view of the fact that the reflectance in a visible light wavelength region is small, the transparency becomes higher, and the visibility increases. In addition, the average reflectance within a wavelength range of 800 to 1,200 nm is more preferably 55% or more, and still more preferably 60% or more. When the reflectance in this wavelength region becomes higher, the heat ray shielding effect in a near-infrared wavelength region increases, and a sunlight transmittance is lowered.

[Young's Modulus Properties of Film at 90° C.]

In the biaxially stretched multilayer polyester film of the present invention, a Young's modulus of the film at 90° C. is 2,400 MPa or more, preferably 2,600 MPa or more, and more preferably 2,700 MPa or more in at least one direction of the longitudinal direction and the lateral direction of the film. What the Young's modulus at 90° C. is less than the foregoing range in the both directions of the longitudinal direction and the lateral direction of the film is not preferable because when processed into a laminated glass, the film is deformed, fine irregularities or wrinkles are generated in the film, so that the smoothness of the film is lowered, and the processability into a laminated glass is lowered. In addition, it is more preferable that the Young's modulus of the film at 90° C. falls within the foregoing range in both the longitudinal direction and the lateral direction of the film.

In order to obtain the Young's modulus properties at 90° C., there is exemplified a method in which polyethylene-2,6-naphthalenedicarboxylate is used as the polyester (A) constituting the first layer, furthermore, the polyester of any one of the embodiments is used as the polyester (B) constituting the second layer, and moreover, a protective layer composed of a polymer having a glass transition temperature of 90° C. or higher and having a thickness of 5 µm or more and not more than 20 µm is used according to the embodiment of the polyester (B).

In view of the fact that a protective layer having such properties is provided on the both sides of the laminated structure portion (I), even when the polyester of the second layer is softened under an atmosphere of 90° C., the protective layer has sufficient rigidity, so that the processability into a laminated glass can be increased.

In addition, by using polyethylene-2,6-naphthalenedicarboxylate for the first layer, furthermore, using a polyester having a glass transition temperature (Tg) of lower than 90° C. as the polyester (B) constituting the second layer, and simultaneously increasing an area magnification of the stretching to sufficiently achieve oriented crystallization of the first layer, though the second layer itself is softened under an atmosphere at 90° C., and the Young's modulus at 90° C. tends to be lowered, the first layer acts as a rigid layer of the laminated polyester film, and such Young's modulus properties can be obtained.

In addition, by using a polyester having a glass transition temperature of 90° C. or higher as the polyester (B) constituting the second layer, sufficient rigidity at 90° C. is obtained, at the time of processing into a laminated glass, processing can be achieved without causing softening of the second layer, and the processability into a laminated glass can be increased.

[Young's Modulus of Film at 20° C.]

In the biaxially stretched laminated polyester film of the present invention, in the case where the polyester constituting the second layer is the polyester (B-ii) having a glass transition temperature of lower than 90° C., at the same time, it is preferable that the Young's modulus of the film at 20° C. is 5,000 MPa or more in at least one direction of the longitudinal direction and the lateral direction of the film, and it is more preferable that the Young's modulus of the film at 20° C. is 5,000 MPa or more in both the longitudinal direction and the lateral direction of the film. Here, in the case where the Young's modulus properties at 20° C. are satisfied in only one direction, it is preferable that such a direction is the same direction as a direction in which the Young's modulus at 90° C. is higher.

Even when the polyester constituting the second layer is a polymer having a glass transition temperature of lower than 90° C. and being easily softened at the time of processing into a laminated glass, by simultaneously increasing an area magnification of the stretching to sufficiently achieve oriented crystallization of the first layer, a degree of oriented crystallization of the first layer is increased, and the Young's modulus of the film at 20° C. is made to fall within such a region, whereby the Young's modulus properties of the present invention at a temperature of 90° C. can be obtained. The area magnification for obtaining such Young's modulus properties is preferably 17 times or more, more preferably 18 times or more, and especially preferably 20 times or more.

In addition, even in the case where the polyester constituting the second layer is a polyester having a glass transition temperature of 90° C. or higher, the stretch ratio can be increased, and furthermore, the Young's moduli at 20° C. and 90° C. can be enhanced.

[Visible Light Transmittance]

In the biaxially stretched laminated polyester film of the present invention, a visible light transmittance within a wavelength range of 400 to 750 nm is preferably 75% or more, more preferably 80% or more, and especially preferably 85% or more. The visible light transmittance can be determined according to the regulations of JIS-R3106. When the film of the present invention is provided with such visible light transmittance properties, when used for a laminated glass for a window such as a building window, an automotive window, etc., transparency with a high degree is obtained, and high visibility is obtained.

[Sunlight Transmittance]

In the present invention, in the biaxially stretched laminated polyester film, when used for a laminated glass for a window such as a building window, an automotive window, etc., in order to obtain near-infrared light shielding properties with a high degree, a solar transmittance of sunlight as regulated in JIS-R3106 is preferably not more than 80%, more preferably not more than 75%, and especially preferably not more than 70%. Such sunlight transmittance properties are obtained by increasing a reflecting performance in a wavelength region of 800 to 1,200 nm while increasing the transmittance in a visible region as described above.

[Thermal Shrinkage Properties]

In the biaxially stretched laminated polyester film of the present invention, in the case where it is used for an application to a laminated glass having a curved surface, a thermal shrinkage at 120° C. for 30 minutes is preferably 0.6 to 3.0%, and more preferably 0.9 to 3.0%; in both the longitudinal direction and the lateral direction of the film. When the heat shrinkage is less than the lower limit, there is a concern that when processing into a laminated glass by sandwiching the film between laminated glasses having a curved surface and sticking them to each other by a heating treatment is applied, there is a concern that the film cannot sufficiently shrink in conformity with the curved shape of glass depending upon the curved shape, and wrinkles are generated. On the other hand, when the thermal shrinkage exceeds the upper limit, there is a concern that the shrinkage of the film at the time of processing into a laminated glass becomes large, and the reflection wavelength changes.

In the film production step, such thermal shrinkage properties can be obtained by controlling a heat set temperature to 150 to 210° C., and the heat set temperature is more preferably in the range of 150 to 200° C.

[Lubricant]

From the viewpoint of maintaining high transparency in a visible light wavelength region, it is preferable that the biaxially stretched laminated polyester film of the present invention does not contain inactive particles in the film. However, for the purpose of preventing fine scratches in the production step or enhancing wind-up properties of the film, it is also tolerable to contain a small amount of inactive particles. In that case, the inactive particles may be contained in either one or both of the first layer and the second layer. As the inactive particles, for example, those having an average particle diameter of 0.01 μm to 2 more preferably 0.05 to 1 μm, and especially preferably 0.1 to 0.3 μm may be used. In the case of using inactive particles, the inactive particles can be blended in an amount of, for example, 0.001% by weight to 0.01% by weight on the basis of the weight of the laminated film.

In the case of blending inactive particles, when the average particle diameter of the inactive particles is smaller than the lower limit, or the content thereof is less than the lower limit, an effect for enhancing the wind-up properties of the film is easy to become insufficient. On the other hand, when the content of the inactive particles exceeds the upper limit, or the average particle diameter thereof exceeds the upper limit, the transparency tends to be lowered.

Examples of the inactive particles include inorganic inactive particles such as silica, alumina, calcium carbonate, calcium phosphate, kaolin, talc, etc.; and organic inactive particles such as silicone, crosslinked polystyrene, and a styrene-divinylbenzene copolymer.

These inactive particles are preferably granular particles having a longer diameter-to-shorter diameter ratio of not more than 1.2, and more preferably not more than 1.1 (hereinafter often referred to as "pearly particles") from the viewpoint of maintaining the lubricity and transparency of the film as far as possible. In addition, it is preferable that the particle size distribution of these inactive particles is sharp.

[Ultraviolet Light Absorber]

It is preferable that the biaxially stretched laminated polyester film of the present invention has at least one layer containing an ultraviolet light absorber.

The ultraviolet light absorber which is used in the present invention is an ultraviolet light absorber having an extinction coefficient E at a wavelength of 380 nm of preferably 2 or more, and more preferably 3 or more. The extinction coefficient as referred to herein is expressed by the following equation (1), and it is an extinction coefficient obtained by measuring an absorbance of the ultraviolet light absorber dissolved in tetrahydrofuran and calculating from a concentration value according to the Lambert-Beer equation.

$$\varepsilon = A/(c \times b) \quad (1)$$

(In the foregoing equation (1), ε represents an extinction coefficient; A represents an absorbance; c represents a concentration (g/L); and b represents an optical path length (cm) in the sample.)

By using the ultraviolet light absorber having such light absorption properties, nevertheless the laminated polyester film containing a polyethylene-2,6-naphthalenedicarboxylate layer having relatively low ultraviolet light durability, it is possible to impart high ultraviolet light durability such that the laminated polyester film can be used for heat ray shielding applications to windows of vehicles or buildings, or the like.

Examples of the ultraviolet light absorber include a triazine-based ultraviolet light absorber, a benzotriazole-based ultraviolet light absorber, a benzophenone-based ultraviolet light absorber, a benzoxazinone-based ultraviolet light absorber, a cyano acrylate-based ultraviolet light absorber, and a salicylate-based ultraviolet light absorber. Though a triazine-based ultraviolet light absorber or a benzotriazole-based ultraviolet light absorber is preferably used, all of these ultraviolet light absorbers are not always satisfactory with respect to the above-described light absorption properties, and it is necessary to use an ultraviolet light absorber selected among these ultraviolet light absorbers.

Specifically, examples of the ultraviolet light absorber satisfied with the properties such that the extinction coefficient ε at a wavelength of 380 nm is 2 or more include
2-(2-hydroxy-4-[1-octyloxycarbonylethoxy]phenyl)-4,6-bis(4-phenylphenyl)-1,3,5-triazine,
2-(2H-benzotriazol-2-yl)-4,6-bis(1-methyl-1-phenylethyl)phenol,
2-(2H-benzotriazol-2-yl)-6-(1-methyl-1-phenylethyl)-4-(1,1,3,3-tetramethylbutyl)phenol, octyl-3-[3-tert-butyl-4-hydroxy-5-(5-chloro-2H-benzotriazol-2-yl)phenyl]propipnate,
2-ethylhexyl-3-[3-tert-butyl-4-hydroxy-5-(5-chloro-2H-benzotriazol-2-yl)phenyl]propionate,
2-(2H-benzotriazol-2-yl)-4,6-bis(1-ethyl-1-phenylethyl)phenol,
2-(5-chloro-2H-benzotriazol-2-yl)-6-(1,1-dimethylethyl)-4-methyl,
2,2'-methylenebis(6-(2H-benzotriazol-2-yl)-4-1,1,3,3-tetra methylbutyl)phenol),
2-(4,6-diphenyl-1,3,5-triazin-2-yl)-5-[(hexyl)oxy]phenol,
2,4-bis(2-hydroxy-4-butyloxyphenyl)-6-(2,4-bis-butyloxyphenyl)-1,3,5-triazine, benzenepropanoic acid,
3-(2H-benzotriazol-2-yl)-5-(1,1-dimethylethyl)-4-hydroxy-C7-9 branched and chain alkyl esters,
2-(2-hydroxy-5-tert-methylphenyl)-2H-benzotriazole,
2-(2H-benzotriazol-2-yl)-4,6-di-tert-pentylphenol,
2,2'-dihydroxy-4-methoxybenzophenone,
2-[4,6-bis(2,4-dimethylphenyl)-1,3,5-triazin-2-yl]-5-(octyloxy)phenol, and
2-(2'-hydroxy-5'-octylphenyl)benzotriazole.

A concentration of the ultraviolet light absorber in the layer containing an ultraviolet light absorber is, for example, 0.1% by weight or more, preferably 1 to 80% by weight, more preferably 1 to 50% by weight, and still more preferably 5 to 20% by weight on the basis of the weight of the layer. When the content of the ultraviolet light absorber is less than the lower limit, there is a concern that a sufficient effect for absorbing an ultraviolet light is not obtained.

In the case where the biaxially stretched laminated polyester film of the present invention contains such an ultraviolet light absorber, an average light transmittance of the film within a wavelength range of 300 nm or more and less than 400 nm is preferably not more than 10%, and more preferably not more than 5%.

In the case of containing the ultraviolet light absorber in any one of the layers of the biaxially stretched laminated polyester film of the present invention, it is preferable that the ultraviolet light absorber is contained in at least the outermost layer, and in the case of providing a protective layer on the both sides of the multilayer laminated portion, it is preferable that the ultraviolet light absorber is contained in at least the protective layer.

Besides, there may also be adopted an embodiment in which the layer containing an ultraviolet light absorber is provided on the outermost layer of the laminated film by a co-extrusion method; or an embodiment in which a coating layer is provided by a method such as coating, etc., and an ultraviolet light absorber is contained in such a coating layer.

In providing such a layer on the outermost layer of the laminated film, it is preferable to stick the ultraviolet light absorber onto the film by using a binder resin. Examples of the binder resin include a polyester resin, an acrylic resin, an acrylic silicon resin, a urethane resin, a fluorine resin, a silicon resin, a melamine-based resin, a cellulose resin, and a polyamide resin. Of these binder resins, an acrylic resin, an acrylic silicon resin, a urethane resin, a silicon resin, and a fluorine resin are preferable because of excellent light stability; and a polyester resin is easily laminated in the alternately laminated portion between the first layer and the second layer by a co-extrusion method or the like.

In addition, as described later, in the case of being used for a laminated glass, it is more preferable to contain the ultraviolet light absorber in a resin layer that allows the glass sheet and the film to adhere to each other, such as polyvinyl butyral as described later. In this way, it is preferable to shield an ultraviolet light at a stage before the ultraviolet light reaches the polyethylene-2,6-naphthalenedicarboxylate layer, and it is preferable to contain the ultraviolet light absorber in the layer positioned outside.

In addition, a quencher or a light stabilizer such as HALS may be used jointly together with the ultraviolet light absorber.

[Coating Layer]

In the biaxially stretched laminated polyester film of the present invention, in order to inhibit a phenomenon in which when processed into a laminated glass, an image reflected on the laminated glass is seen distorted, it is preferable that a coating layer (hereinafter often referred to as "coating film" or "easily adhesive layer") having a refractive index of 1.60 to 1.63 and a thickness of 0.05 to 0.20 μm, and preferably 0.08 to 0.12 μm is provided on at least one surface of the above-described laminated polyester film. In the case where the refractive index or thickness of the coating layer falls outside the foregoing range, there is a concern that the phenomenon in which when processed into a laminated glass, an image reflected on the laminated glass is seen distorted cannot be sufficiently decreased. In addition, when the coating layer becomes thick, the haze tends to become high, and when the thickness of the coating layer exceeds the upper limit, there is a concern that a lowering of the visibility to be caused due to the diffused light is accompanied.

The constitution of the coating layer is arbitrary so long as it has the above-described refractive index properties. For example, a combined use of, as polymer binder components, a polyester C containing a diol component having a specified fluorene structure and having a glass transition temperature of 90 to 135° C. and a polyester D having a glass transition temperature of 25° C. or higher and not higher than 80° C. is preferable because it is easy to take a balance between the conformation in refractive index of the coating layer and the film forming properties by an in-line coating method to be generally adopted at the time of forming a coating layer.

(Polyester C)

The polyester C constituting the coating layer is preferably a polyester containing, as a diol component, a component having a fluorene structure represented by the following formula (I) in an amount of 20 to 80% by mole relative to the whole diol components and having a glass transition temperature of 90 to 135° C.

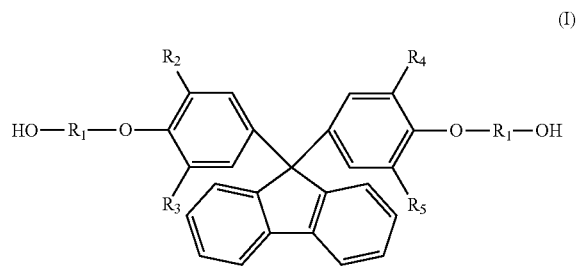

($R_1$ represents an alkylene group having 2 to 4 carbon atoms; and $R_2$, $R_3$, $R_4$, and $R_5$ may be the same as or different from each other and each represent hydrogen, an alkyl group having 1 to 4 carbon atoms, an aryl group, or an aralkyl group.)

When the polyester C obtained by using a component having such a fluorene structure as one of the diol components is used as the polymer binder component of the coating layer, it is possible to easily adjust the refractive index of the coating layer to a range of 1.60 to 1.63.

Examples of the diol component having a fluorene structure include 9,9-bis[4-(2-hydroxyethoxy)phenyl]fluorene, 9,9-bis[4-(2-hydroxyethoxy)-3-methylphenyl]fluorene, 9,9-bis[4-(2-hydroxyethoxy)-3,5-dimethylphenyl]fluorene, 9,9-bis[4-(2-hydroxyethoxy)-3-ethylphenyl]fluorene, 9,9-bis[4-(2-hydroxyethoxy)-3,5-diethylphenyl]fluorene, 9,9-bis[4-(2-hydroxyethoxy)-3-propylphenyl]fluorene, 9,9-bis[4-(2-hydroxyethoxy)-3,5-dipropylphenyl]fluorene, 9,9-bis[4-(2-hydroxyethoxy)-3-isopropylphenyl]fluorene, 9,9-bis[4-(2-hydroxyethoxy)-3,5-diisopropylphenyl]fluorene, 9,9-bis[4-(2-hydroxyethoxy)-3-n-butylphenyl]fluorene, 9,9-bis[4-(2-hydroxyethoxy)-3,5-di-n-butylphenyl]fluorene, 9,9-bis[4-(2-hydroxyethoxy)-3-isobutylphenyl]fluorene, 9,9-bis[4-(2-hydroxyethoxy)-3,5-diisobutylphenyl]fluorene, 9,9-bis[4-(2-hydroxyethoxy)-3-(1-methylpropyl)phenyl]fluorene, 9,9-bis[4-(2-hydroxyethoxy)-3,5-bis(1-methylpropyl)phenyl]fluorene, 9,9-bis[4-(2-hydroxyethoxy)-3-phenylphenyl]fluorene, 9,9-bis[4-(2-hydroxyethoxy)-3,5-diphenylphenyl]fluorene, 9,9-bis[4-(2-hydroxyethoxy)-3-benzylphenyl]fluorene, 9,9-bis[4-(2-hydroxyethoxy)-3,5-dibenzylphenyl]fluorene, 9,9-bis[4-(3-hydroxypropoxy)phenyl]fluorene, and 9,9-bis[4-(4-hydroxybutoxy)phenyl]fluorene. Above all, 9,9-bis[4-(2-hydroxyethoxy)phenyl]fluorene is especially preferable.

The lower limit value of the content of the diol component having such a fluorene structure is preferably 25% by mole, and more preferably 30% by mole. On the other hand, the upper limit value thereof is preferably 75% by mole, and more preferably 70% by mole.

In the case where the content of the diol component having such a fluorene structure is less than the lower limit value, there is a concern that an effect for enhancing the refractive index is small, and it is difficult to obtain the coating layer whose refractive index falls within the foregoing range. On the other hand, in the case where the content of the diol component exceeds the upper limit value, when processed into a laminated glass, there is a concern that not only the adhesiveness to the resin layer such as an ethylene-vinyl acetate copolymer, polyvinyl butyral, an ionomer resin, etc. is lowered, but the film surface becomes rough, or the blocking resistance is lowered.

As other diol component constituting the polyester C, there is exemplified ethylene glycol. It is preferable that ethylene glycol is contained in an amount ranging from 20 to 80% by mole relative to the whole diol components of the polyester C. The lower limit value of the content of such ethylene glycol is preferably 35% by mole, and more preferably 40% by mole. In addition, the upper limit value of the content of ethylene glycol is preferably 75% by mole, and more preferably 65% by mole. In the case where the content of ethylene glycol is less than the lower limit value, there is a concern that the blocking resistance of the film is lowered. On the other hand, in the case where the content of ethylene glycol exceeds the upper limit value, the content of the above-described diol component having a fluorene structure becomes less than the lower limit value.

Examples of a diol component other than the diol component having a fluorene structure and ethylene glycol constituting the polyester C include 1,4-butanediol, 1,4-cyclohexanedimethanol, bisphenol A, and the like. In addition, diethylene glycol which is not added as the monomer component but is generated in the polymerization process may be contained, too. A lower limit value of the content of such other diol component is preferably 5% by mole. On the other hand, an upper limit value of the content of other diol component is preferably 40% by mole, more preferably 20% by mole, and still more preferably 10% by mole.

It is preferable that a component derived from a naphthalenedicarboxylic acid, especially a component derived from 2,6-naphthalenedicarboxylic acid, is contained in an amount of 40 to 99% by mole relative to the whole dicarboxylic acid components of the polyester C as the dicarboxylic acid component which is used for the polyester C. By using a naphthalenedicarboxylic acid as the dicarboxylic acid component, the refractive index of the polyester C can be increased, and the refractive index of the coating layer can be easily made to fall within the foregoing range.

The lower limit value of the content of the component derived from a naphthalenedicarboxylic acid is more preferably 50% by mole, still more preferably 60% by mole, and especially preferably 70% by mole. In addition, the upper limit value of the proportion of the component derived from a naphthalenedicarboxylic acid is more preferably 95% by mole.

It is preferable that 0.1 to 5% by mole of a component derived from an aromatic dicarboxylic acid having a sulfonic acid salt group and 0 to 60% by mole of other aromatic dicarboxylic acid are contained as other dicarboxylic acid component which is used for the polyester C relative to the whole dicarboxylic acid components of the polyester C. When the aromatic dicarboxylic acid having a sulfonic acid salt group is contained as the copolymerization component, it becomes easy to water-disperse the polyester C.

The lower limit value of the content of the aromatic dicarboxylic acid having a sulfonic acid salt group is more preferably 1% by mole, still more preferably 2% by mole, and especially preferably 3% by mole. In the case where the content of the aromatic dicarboxylic acid having a sulfonic acid salt group is less than the lower limit value, there is a concern that the hydrophilicity of the polyester C is lowered, and the water-dispersing is not sufficient. On the other hand, when the content of the aromatic dicarboxylic acid having a sulfonic acid salt group exceeds the upper limit value, the hydrophilicity of the film becomes large, and as a result, there is a concern that the blocking resistance is lowered.

Preferred examples of such an aromatic dicarboxylic acid having a sulfonic acid salt group include 5-sodium sulfoisophthalic acid, 5-potassium sulfoisophthalic acid, 5-lithium sulfoisophthalic acid, and 5-phosphonium sulfoisophthalic acid. In order to enhance the water dispersibility, 5-sodium sulfoisophthalic acid, 5-potassium sulfoisophthalic acid, and 5-lithium sulfoisophthalic acid are more preferable. Above all, 5-sodium sulfoisophthalic acid is the most preferable.

As for the dicarboxylic acid component of the polyester C, it is preferable that a component derived from a naphthalenedicarboxylic acid is contained, from the viewpoint of refractive index properties, and furthermore, a component derived from an aromatic dicarboxylic acid having a sulfonic acid salt group is used from the standpoint of easiness of water-dispersing the polyester C. However, other aromatic dicarboxylic acid may also be used together with these components. Examples of other aromatic dicarboxylic acid include isophthalic acid, terephthalic acid, and biphenyldicarboxylic acid. Of these, isophthalic acid is especially preferable.

A lower limit value of the proportion of other aromatic dicarboxylic acid is preferably 3% by mole, and more preferably 5% by mole. In addition, an upper limit value of the proportion of other aromatic dicarboxylic acid is preferably 50% by mole, more preferably 40% by mole, and still more preferably 30% by mole.

The glass transition temperature of the polyester C is 90 to 135° C., and more preferably 100 to 130° C. Such a glass transition temperature can be easily attained by allowing the constituent components of the polyester C and the content thereof to fall within the above-described preferred ranges.

A refractive index of the polyester C is preferably more than 1.60 and not more than 1.65, and more preferably 1.63 to 1.65. Such refractive index properties can be attained by using a diol component having a fluorene structure as the diol component of the polyester C, and furthermore, can be more easily attained by using jointly a naphthalenedicarboxylic acid component as the dicarboxylic acid component.

An intrinsic viscosity of the polyester C is preferably 0.2 to 0.8 dL/g. Such an intrinsic viscosity is a value measured at 35° C. by using orthochlorophenol.

(Polyester D)

In the coating layer in the present invention, it is preferable to use jointly a polyester D having a glass transition temperature of 25 to 80° C. in addition to the above-described polyester C.

When the polyester D having a glass transition temperature falling within such a temperature range is used together with the polyester C, the coating layer is coated on the laminated polyester film, thereafter, the coating layer becomes sufficiently softened at a temperature of the step of applying a stretching treatment to the film, and the fragileness of the polyester C is improved, whereby the film forming properties of the coating layer can be increased. Then, by increasing the film forming properties of the coating layer, the surface of the coating layer becomes smooth, so that the deterioration of a haze value to be caused due to the coating layer can be minimized.

The lower limit value of the glass transition temperature of the polyester D is preferably 50° C., and more preferably 60° C. In addition, the upper limit value of the glass transition temperature of the polyester D is preferably 75° C. In the case where the glass transition temperature of the polyester D is lower than the lower limit value, there is a concern that the solvent resistance of the coating layer is lowered due to the polyester C. On the other hand, when the glass transition temperature of the polyester D exceeds the upper limit value, an effect for increasing the film forming properties of the coating layer is not revealed.

Examples of the dicarboxylic acid component which is used for the polyester D include terephthalic acid, isophthalic acid, phthalic acid, adipic acid, sebacic acid, 5-Na sulfoisophthalic acid, and the like. Above all, terephthalic acid and isophthalic acid are preferable.

In addition, examples of the diol component which is used for the polyester D include ethylene glycol, diethylene glycol, neopentyl glycol, 1,4-butanediol, 1,6-hexanediol, 1,4-cyclohexanedimethanol, an alkylene oxide adduct of bisphenol A, and the like. Besides, a polyhydroxy compound such as glycerin, trimethylolpropane, etc. may be used in a small amount range. Besides, among the whole dicarboxylic acid components of the polyester D, a naphthalenedicarboxylic acid component or the like may be used in a small amount, for example, within a range of not more than 20% by mole.

Of these, as the especially preferred polyester 3D, there is exemplified a copolymerized polyester containing 90% by mole or more of terephthalic acid relative to the whole dicarboxylic acid components of the polyester D and ethylene glycol and bisphenol A as the diol component, and by adjusting a proportion of ethylene glycol and bisphenol A, the glass transition temperature of the polyester D can be adjusted.

A refractive index of the polyester D is preferably 1.50 to 1.59, and more preferably 1.55 to 1.58. In addition, an intrinsic viscosity of the polyester D is preferably 0.2 to 0.8 dL/g.

(Content of Polyester C and Polyester ID)

A total content of the polyester C and the polyester D is preferably 50 to 100% by weight, more preferably 60 to 97% by weight, and still more preferably 60 to 95% by weight on the basis of the weight of the coating layer. When the content of the polyester C and the polyester D occupying in the coating layer falls within the foregoing range, it is possible to make both the refractive index properties and the film forming properties of the coating layer favorable.

In addition, the content of the polyester C is preferably 40 to 80% by weight, and more preferably 45 to 75% by weight on the basis of the total amount of the polyester C and the polyester D. When the content of the polyester C falls within the foregoing range, it is possible to simultaneously enhance the film forming properties in the film stretching step while increasing the refractive index properties of the coating layer. On the other hand, in the case where the content of the polyester C is less than the lower limit value, there is a concern that the refractive index of the coating layer cannot be sufficiently increased. On the other hand, in the case where the content of the polyester C exceeds the upper limit value, not only there is a concern that an enhancement of the film forming properties in the film stretching step by the polyester D is not sufficient, breakage is generated in the coating layer to cause surface scattering, and the haze value increases due to the coating layer, but there is a concern that when processed into a laminated glass, the adhesion to the resin layer becomes poor.

(Other Polymer Binder Component)

As other polymer binder constituting the coating layer, an acrylic resin, a urethane resin, and a modified material thereof, and the like may be further added as the need arises. By using jointly a small amount of such a resin in addition to the polyesters C and D, it is possible to increase the adhesiveness to the resin layer which is used for the laminated glass in addition to the refractive index properties. In the case of using other polymer binder component than the polyesters C and D, its content is preferably not more than 40% by weight, more preferably not more than 30% by weight, and still more preferably 1 to 20% by weight on the basis of the weight of the coating layer.

(Surfactant)

In the coating layer in the present invention, it is preferable to further contain a surfactant. In the case of using a surfactant, its content is in the range of preferably 0.1 to 10% by weight, and especially preferably 0.5 to 7% by weight on the basis of the weight of the coating layer. By containing the surfactant within the foregoing range, the water dispersibility of the polyester C can be increased, and the particle diameter of the polyester C in the aqueous coating solution becomes small to further increase the flatness of the surface of the coating layer, and therefore, the haze value can be made more favorable.

(Particle)

In the coating layer in the present invention, in the case of processing into a laminated glass and being used as am automotive windshield, from the viewpoint of increasing the visibility, the content of particles in the coating layer is preferably not more than 1% by weight on the basis of the weight of the coating layer. In addition, the content of the particles is more preferably 0.001 to 0.8% by weight, and still more preferably 0.1 to 0.5% by weight. The particles in the coating layer are added in an extremely small amount for the purpose of imparting slipperiness, and by controlling the content of the particles to the foregoing range, the deterioration of the haze value to be caused due to the coating layer can be decreased, and the haze value of the whole of the film can be decreased.

In the present invention, so long as a high refractive index of the coating layer is attained by using the polyester C as the polymer binder component, it becomes unnecessary to realize a high refractive index of the coating layer due to the particles, and therefore, the content of the particles can be minimized within the range where the slipperiness is not impaired.

An average primary particle diameter of such particles is preferably 5 to 200 nm. When the average primary particle diameter of the particles exceeds 200 nm, there is a concern that optical scattering is generated, and the transparency of the coating layer is lowered. On the other hand, when the average primary particle diameter of the particles is less than 5 nm, there is a concern that coagulation among the particles increases, and a secondary particle diameter becomes large, so that optical scattering is generated, and the transparency of the coating layer is lowered.

The kind of the particles is not particularly limited, and examples of the particles which can be used include inorganic particles such as calcium carbonate, magnesium carbonate, calcium oxide, zinc oxide, magnesium oxide, silicon oxide, sodium silicate, aluminum hydroxide, iron oxide, zirconium oxide, barium sulfate, titanium oxide, tin oxide, antimony trioxide, carbon black, molybdenum disulfide, etc.; and organic particles such as an acrylic crosslinked polymer, a styrene-based crosslinked polymer, a silicone resin, a fluorine resin, a benzoguanamine resin, a phenol resin, a nylon resin, etc.

[Formation of Coating Layer]

The coating layer in the present invention can be preferably formed by coating the above-described polyesters C and D in a water dispersion state, or if desired, a mixture thereof with other coating layer component to be used jointly in an aqueous coating solution state, on at least one surface, and preferably both surfaces of the laminated polyester film.

The polyester water dispersion is preferably produced by the following method. That is, the polyesters C and D are dissolved in a hydrophilic organic solvent not only having a solubility in one liter of water of 20 g or more at 20° C. but having a boiling point of not higher than 100° C., or capable of causing azeotropy with water at not higher than 100° C. Examples of the organic solvent having such a solubility and capable of dissolving a polyester therein include dioxane, acetone, tetrahydrofuran, and methyl ethyl ketone. By further adding a small amount of a surfactant to such a solution, it is also possible to enhance wettability of the obtained aqueous coating solution with the film.

To the organic solution having the polyesters C and D dissolved therein, water is then added under stirring, and preferably under high-speed stirring at an elevated temperature, thereby forming a bluish white to milky white dispersion. In addition, a bluish white to milky white dispersion can also be formed by a method of adding the above-described organic solution to water under stirring.

By separating and removing the organic solvent from the obtained dispersion, the desired polyester water dispersion is obtained. For example, the desired polyester water dispersion is obtained by a method of distilling off the hydrophilic organic solvent at atmospheric pressure or under reduced pressure. Incidentally, in the case where the polyesters C and D are dissolved in a hydrophilic organic solvent capable of causing azeotropy with water, at the time of distilling off the organic solvent, water causes azeotropy, and therefore, it is desirable to disperse the polyester in a rather larger quantity of water in advance while taking a weight loss of water into consideration.

In addition to the above, when the solid content concentration after removing the organic solvent exceeds 40% by weight, re-coagulation of the polyester to be dispersed in water is easily caused, and stability of the water dispersion is lowered. Therefore, it is preferable to control the solid content concentration of the water dispersion to not more than 40% by weight. On the other hand, when the concentration is too small, a time required for drying becomes long, and therefore, a lower limit of the solid content concentration is preferably 0.1% by weight or more. Even within the foregoing range, the solid content concentration of the aqueous coating solution which is used in the present invention is more preferably not more than 20% by weight, and especially preferably 1 to 10% by weight relative to the weight of the coating solution. When this proportion is less than 1% by weight, there is a concern that the wettability with the polyester film is insufficient. On the other hand, when this proportion exceeds 20% by weight, there is a concern that the stability of the coating solution or the appearance of the coating layer is deteriorated.

Coating of the aqueous coating solution onto the laminated polyester film can be carried out at an arbitrary stage. However, it is preferable to carryout coating in the production process of a laminated polyester film, and it is more preferable to carry out coating on the film before the accomplishment of oriented crystallization.

The "film before the accomplishment of oriented crystallization" as referred to herein includes an unstretched film, an uniaxially oriented film obtained by orienting an unstretched film in anyone of the longitudinal direction and the lateral direction, a film obtained by stretching and orienting an unstretched film in two directions of the longitudinal direction and the lateral direction at a low stretch ratio (biaxially stretched film before the accomplishment of oriented crystallization by finally re-stretching the film in the longitudinal direction or the lateral direction), and the like. Above all, it is preferable that the above-described aqueous coating solution is coated on an unstretched film or an uniaxially stretched film obtained by orienting an unstretched film in one direction and subjected to longitudinal stretching and/or lateral stretching as well as heat set.

At the time of coating the aqueous coating solution on the film, as a preliminary treatment for the purpose of enhancing coating properties, the film surface may be subjected to a physical treatment such as a corona surface treatment, a flame treatment, a plasma treatment, etc.

The coating solution is used by adjusting its coating amount such that the thickness of the coating film falls within the foregoing range. As a coating method, a known arbitrary coating method can be applied. For example, a roll coating method, a gravure coating method, a roll brush method, a spray coating method, an air knife coating method, an impregnation method, a curtain coating method, and the like can be adopted solely or in combination. Above all, a roll coating method is preferable, and among the roll coating methods, a gravure coating method is more preferable.

[Production Method]

As for a method for producing the biaxially stretched laminated polyester film of the present invention, first of all, 51 layers or more in total of the polyester (A) for the first layer which is supplied from a first extruder and the polyester (B) for the second layer which is supplied from a second extruder are alternately superimposed in a molten state to obtain unstretched laminated sheet, which is then cast on a rotating drum, thereby fabricating an unstretched laminated film.

Subsequently, the obtained unstretched laminated film is stretched in two axial directions of the film forming direction (longitudinal direction, longer direction, or MD direction) and the direction orthogonal thereto (lateral direction, width direction, or TD direction). It is preferable to control a stretching temperature to a range of the glass transition temperature (Tg) to (Tg+50)° C. of the polyester (A) and to control an area magnification of stretching to 5 to 50 times.

In addition, in the case where not only the glass transition temperature of the polyester (B) of the second layer is lower than 90° C., but a protective layer having a thickness so as to contribute to the Young's modulus properties is not provided, it is preferable to control the area magnification of stretching to 17 times or more. When the stretch ratio is larger, the Young's modulus at 90° C. can be increased, the processability into a laminated glass increases, and simultaneously, scattering in the plane direction in each layer of the first layer and the second layer becomes small due to thinning by stretching, whereby an optical interference of the laminated film becomes uniform in the plane direction.

In addition, in the case where the glass transition temperature of the second layer is lower than 90° C., as for the stretch ratio for the purpose of increasing the Young's modulus properties at 90° C., it is preferable to carry out stretching in a ratio of 4.0 times or more in both the film forming direction and the lateral direction.

The stretching method may be any method of sequential biaxial stretching and simultaneous biaxial stretching.

Subsequently, this biaxially stretched laminated polyester film is subjected to a heat treatment. In the case where the biaxially stretched laminated polyester film is used for a planar laminated glass or the like, it is preferable to carry out the heat treatment in a range of the melting point of the polyester of the second layer or higher to a temperature of 10° C. lower than the melting point of the polyester of the first layer. By carrying out the heat treatment within such a temperature range, the first layer is crystallized, the second layer is melted to become non-oriented, and the difference in refractive index between the layers as generated by stretching becomes larger, whereby a high reflectance can be obtained. When the heat treatment temperature is not a temperature of 10° C. or more lower than the melting point of the polyester of the first layer, there is a concern that the orientation of the molecular chain within the first layer is relieved, whereby the refractive index is lowered, and it becomes difficult to impart a sufficient difference in refractive index to the obtained laminated film.

In addition, in the case where the biaxially stretched laminated polyester film is used for a curved laminated glass or the like, it is preferable that the film is provided with the above-described thermal shrinkage properties. For that reason, it is preferable to carry out the heat treatment in a temperature range of 150 to 210° C.

Application

The biaxially stretched laminated polyester film of the present invention has a high transmittance in a visible light wavelength region and simultaneously has high reflection properties in a near-infrared wavelength region, and therefore, it can be widely used for applications in which it is required to shield heat rays. In particular, since the biaxially stretched laminated polyester film of the present invention has excellent processability at the time of processing into a laminated glass, it is suitably used for a laminated glass application and can be used for a laminated glass for a window such as a building window, an automotive window, etc.

The laminated glass has a structure in which the biaxially stretched laminated polyester film of the present invention is sandwiched between two glass sheets via a resin layer composed of at least one member selected from an ethylene-vinyl acetate copolymer, polyvinyl butyral, and an ionomer resin. Examples of the processing method of a laminated glass include a method of superimposing these lamination members and then heating them while applying a pressure.

In the laminated glass of the present invention, it is preferable that an ultraviolet light absorber is further contained in the above-described resin layer in which polyvinyl butyral or the like is used.

On that occasion, a thickness of the resin layer is preferably 0.05 to 20 μm, and more preferably 0.1 to 10 μm. In view of the fact that the thickness of the resin layer falls within this range, sufficient ultraviolet light absorption properties can be obtained.

In addition, in the case where the resin layer contains an ultraviolet light absorber, it is preferable that an average light transmittance of the laminated glass within a wavelength range of 300 nm or more and less than 400 nm is not more than 10%.

At the time of being used as a laminated glass, in view of the fact that the above-described ultraviolet light absorber is further contained in the resin layer, nevertheless the laminated polyester film including a polyethylene-2,6-naphthalenedicarboxylate layer having relatively low ultraviolet durability, even when it is used for heat ray shielding of a window of a vehicle or a building, or the like for a long period of time, cloudiness, yellowing, or the like of the film by an ultraviolet light can be efficiently suppressed, and high ultraviolet durability can be imparted.

[Metal-Based Laminate]

In the present invention, the biaxially stretched laminated polyester film of the present invention may be constituted such that a laminate of a metal and/or a metal oxide having a laminated structure (II) in which a low-refractive index layer and a high-refractive index layer are alternately laminated is further laminated on one surface thereof. Here, a difference in refractive index between the low-refractive index layer and the high-refractive index layer constituting the laminate of a metal and/or a metal oxide is preferably 0.1 or more, and more preferably 0.5 or more. So long as the difference in refractive index between the both layers is satisfied with such a relation, the range of the refractive index of each layer is not particularly limited.

The metal can be used for the low-refractive index layer, and the metal oxide can be used for both the low-refractive index layer and the high-refractive index layer.

In addition, at the time of laminating the metal-based laminate on one surface of the biaxially stretched laminated polyester film of the present invention, it is preferable that the biaxially stretched laminated polyester film has a protective layer of 5 μm or more and not more than 20 μm. In the case where the thickness of the protective layer is less than the lower limit, there is a concern that when the metal-based laminate is laminated on one surface of the biaxially stretched laminated polyester film of the present invention, the both interfere with each other to lower the visible light transmittance, and the average reflectance in a visible light region as an infrared light shielding structure composed of a combination thereof exceeds 30%.

On the other hand, in the case where the thickness of the protective layer exceeds the upper limit, there is a concern that when molded into a curved laminated glass, the follow-up properties toward the curved proportion tend to be lowered, and besides, a proportion of the thickness of the protective layer to the thickness of the laminated structure (I) of the biaxially stretched laminated polyester film becomes high, so that in the step of a molten state for fabricating the laminated structure (I), the uniformity of the thickness of each other of the laminated structure (I) is impaired, thereby causing scattering in the reflectance properties.

(Metal)

Examples of the metal which is used for the laminate of a metal and/or a metal oxide used in the present invention include metals such as Au, Ag, Cu, Al, etc. Of these, Ag which does not substantially absorb a visible light is especially preferable. Incidentally, the metal forming the metal layer may be used in combination of two or more kinds thereof as the need arises.

As a method of forming such a metal layer, a chemical vapor deposition method is preferable, and a vacuum vapor deposition method, a sputtering method, or a plasma CVD method is especially preferable. A thickness of the metal layer is in the range of 5 to 1,000 nm, and preferably 10 to 500 nm. When the thickness of the metal layer is less than the lower limit, a sufficient heat ray shielding performance is hardly revealed. In addition, when the thickness of the metal layer exceeds the upper limit, the visible light transmittance is easy to become insufficient, so that there is a concern that the transparency is impaired.

(Metal Oxide)

Examples of the metal oxide which is used in the present invention include $TiO_2$, $ZrO_2$, $SnO_2$, $In_2O_3$, $SiO_2$, ITO, IZO, AZO, and the like.

Similar to the above-described method of forming a metal layer, a method of forming such a metal oxide layer is preferably a chemical vapor deposition method, and especially preferably a vacuum vapor deposition method, a sputtering method, or a plasma CVD method. Though a thickness of the metal oxide layer is related to a refractive index and a thickness of other metal layer or metal oxide layer from the standpoint of optical interference, it is preferably in the range of 0.1 to 750 nm, and more preferably in the range of 10 to 500 nm. When the thickness falls outside the foregoing range, there is a concern that an optical interference effect cannot be sufficiently obtained, and there is a concern that the reflectance of a visible light increases, or a heat ray reflecting performance is lowered.

(Laminate)

Though the structure of the laminate of a metal and/or a metal oxide is not particularly limited, for example, a structure in which a layer of a metal oxide is first formed as the high-refractive index layer, a metal layer is subsequently formed as the low-refractive index layer, and a layer composed of a metal oxide is finally formed as the high-refractive index layer, thereby sandwiching the metal layer by the metal oxide layers is preferable because the reflectance in a visible light region can be decreased while keeping the high reflectance in an infrared region due to a reflection preventing effect by the metal oxide. In addition, as another embodiment, a structure in which a metal oxide having a high refractive index and a metal oxide having a low refractive index are laminated, thereby reflecting an infrared light due to interference is also preferable.

From the viewpoint of productivity, the layer number of the laminate of a metal and/or a metal oxide is preferably not more than 40 layers, more preferably not more than 30 layers, and still more preferably not more than 10 layers. In addition, a lower limit of the layer number is preferably 3 layers, and more preferably 5 layers.

[Infrared Light Shielding Structure]

It is preferable that the infrared light shielding structure in the present invention has a structure in which the above-described laminate of a metal and/or a metal oxide is laminated on one surface of the above-described biaxially stretched laminated polyester film via the protective layer of 5 μm or more and not more than 20 μm of the polyester film.

In view of the fact that the infrared light shielding structure has such a structure, the infrared light shielding structure is able to have both a high transmittance of a visible light and a high infrared light shielding performance such that the average reflectance in a wavelength range of 400 to 750 nm is not more than 30%, the average reflectance in a wavelength range of 800 to 1,200 nm is 50% or more, and the average reflectance in a wavelength range of 1,200 to 2,100 nm is 50% or more. In order to allow the average reflectance in a visible light region to fall within the foregoing range, by controlling the thickness of the protective layer of the polyester-based laminated film on the side on which it is stuck to the metal-based laminate to a range of 5 μm or more and not more than 20 μm, thereby making the thickness thicker than that of the conventional one, the interference between these laminates is cancelled, and an infrared light shielding structure which is excellent in visible light transmission in addition to the heat ray shielding performance and suitable for a laminated glass is obtained.

The average reflectance of the infrared light shielding structure at 400 to 750 nm is preferably not more than 25%. When the reflectance in this wavelength region exceeds the upper limit, there is a concern that in the case of being used for a laminated glass of an automotive windshield requiring high visibility, or the like, sufficient visibility is not obtained.

In addition, the average reflectance of the infrared light shielding structure in a wavelength range of 800 to 1,200 nm is preferably 60% or more. When the reflectance in this wavelength region is less than the lower limit, for example, in the case of being stuck onto an automotive windshield or the like and used, a sufficient near-infrared light shielding effect is not obtained, and the temperature within the automobile is easy to increase.

The average reflectance of the infrared light shielding structure in a wavelength region of 1,200 to 2,100 nm is preferably 60% or more. When the reflectance in this wavelength region is less than the lower limit, for example, in the case of being stuck onto an automobile windshield or the like and used, a sufficient far-infrared light shielding effect is not obtained, and a heat feeling felt by a human being within the automobile becomes strong.

EXAMPLES

The present invention is hereunder described in more detail by reference to the following Examples. Incidentally, physical properties and characteristics in the Examples were measured or evaluated by the following methods.

(1) Layer Thickness:

A sample was cut into a triangle, fixed to an embedding capsule, and then embedded with an epoxy resin. Then, the embedded sample was cut along the film forming direction and the thickness direction by using a microtome (ULTRA-CUTS, a manufacturer: Reichert), thereby producing a thin film slice having a thickness of 50 nm. The obtained thin film slice was observed and photographed at an accelerating voltage of 100 kV by using a transmission electron microscope (a manufacturer: JEOL Ltd., a trade name: JEM2010), and a thickness of each layer was measured from the photographs.

Incidentally, in the case where distinguishing is difficult, the film sample cut by the microtome may be dyed with 2% osmic acid at 60° C. for 2 hours and measured for the thickness of the coating layer by using a transmission electron microscope (manufactured by JEOL Ltd., a trade name: JEM2010).

(2) Film Thickness:

A film thickness was measured at a stylus pressure of 30 g by using an electron micrometer (a trade name: K-312A, manufactured by Anritsu Corporation).

(3) Average Reflectance:

A relative mirror reflectance to an aluminum vapor-deposited mirror was measured over a wavelength range of 350 nm to 2,100 nm by using a spectral photometer (MPC-3100, manufactured by Shimadzu Corporation). Among the obtained spectra, an average reflectance obtained by averaging reflectances at 400 to 750 nm and an average reflectance obtained averaging reflectances at 800 to 1,200 nm were determined, respectively.

In addition, even in the case of measuring an average reflectance of the infrared light shielding structure, a reflectance was measured according to the above-described method, and furthermore, an average reflectance of reflectances in a wavelength range of 1,200 to 2,100 nm was determined, too.

(4) Visible Light Transmittance and Solar Transmittance:

A relative spectral transmittance to a barium sulfate integrating sphere at each wavelength was measured in a wavelength range of 300 nm to 2,100 nm by using a spectral photometer (MPC-3100, manufactured by Shimadzu Corporation). A visible light transmittance in a range of 400 to 750 nm and a solar transmittance in a wavelength region of 340 to 1,800 nm were calculated from the obtained transmittance curve in conformity with JIS R3106:1998.

(5) Glass Transition Temperature (Tg):

An internal loss tan δ of the obtained biaxially stretched film was measured by using a dynamic viscoelasticity measuring device (manufactured by Orientec Co., Ltd., DDV-01FP) under a condition in a measuring temperature range of 30 to 180° C. at a temperature rise rate of 2° C./min and at 1 Hz, and a glass transition temperature (Tg) of the first layer was determined from a peak temperature on the high temperature side, and a glass transition temperature (Tg) of the second layer was determined from a peak temperature on the low temperature side, respectively.

In addition, in the case where distinguishing of the glass transition temperature (Tg) of any layer is difficult by the above-described measurement method, the glass transition temperature (Tg) of each layer may be determined by fabricating a single-layer biaxially stretched film of a composition constituting each layer and measuring an internal loss tan δ by using a dynamic viscoelasticity measuring device (manufactured by Orientec Co., Ltd., DDV-01FP) according to the above-described measurement condition.

(6) Young's Modulus:

A test piece obtained by cutting out the film into a size of 150 mm in length and 10 mm in width is used and drawn in a chuck distance of 100 mm at a tensile rate of 10 mm/rain and a chart rate of 500 mm/min in a room regulated at a temperature of 20° C. and a humidity of 50% by using a tensilon UCT-100, manufactured by Orientec Co., Ltd., and a Young's modulus is calculated from a tangent of a rising part of an obtained load-elongation curve. Incidentally, as for the Young's modulus in the longer direction (longitudinal direction), a longitudinal direction (MD direction) of the film is referred to as the measurement direction, and as for the Young's modulus in the width direction (lateral direction), a lateral direction (TD direction) of the film is referred to as the measurement direction. Each of the Young's moduli was measured 10 times, and an average value thereof was adopted.

In addition, the Young's modulus under a temperature atmosphere of 90° C. was determined by setting a test piece and a chuck portion of a tensilon in a chamber set up to a temperature atmosphere of 90° C., and after standing for 2 minutes, carrying out the above-described tensile test.

(7) Polyester Component:

With respect to each layer of a film sample, each component and copolymerization component amount of a polyester were determined by means of the $^1$H-NMR measurement.

(8) Thermal Shrinkage Properties:

A film of 30 cm square in length, which has been measured for a precise length in advance with respect to the longitudinal direction and the lateral direction of the film and marked, is put in an oven set up at 120° C. under a no-load condition; after standing for 30 minutes, the resulting film is taken out and returned to room temperature; and a dimensional change thereof is read.

A thermal shrinkage in each of the longitudinal direction and the lateral direction was determined from a length (L0) before the heat treatment and a dimensional change amount (ΔL) by the heat treatment according to the following equation (2). The thermal shrinkage in each of the directions was evaluated in a sample number of n=5, and an average value thereof was adopted.

$$\text{Thermal shrinkage (\%)} = (\Delta L/L0) \times 100 \quad (2)$$

(9) Measurement of Melting Point and Crystallization Peak of Film by DSC:

With respect to 10 mg of a sample film, a temperature of a crystallization peak and a melting point of each layer were measured at a temperature rise rate of 20° C./min by using DSC (manufactured by TA Instruments, a trade name: DSC2920).

(10) Evaluation of Processability into a Laminated Glass:

Evaluation of Processability into a Laminated Glass (i):

A film was sandwiched by two embossed sheets of polyvinyl butyral (PVB) having a thickness of 0.38 mm by using a laminator in such a manner that the embossed surface of each of the PVB sheets came into contact with the film; the resultant was further sandwiched by two planar glass sheets having a thickness of 2 mm and a size of 500 mm×400 mm; thereafter, the assembly was put in a heating pressurizing furnace and treated at 130° C. and 13 atm. for 30 minutes; only the temperature was decreased to 40° C. while maintaining the pressure; the pressure was then returned to ordinary pressure; the resultant was taken out from the heating pressurizing furnace; and the film protruded into the surroundings of the glass sheets was cut off, thereby obtaining a laminated glass. As the polyvinyl butyral sheet, one with an embossed space of approximately 1 mm was used.

The laminated glass obtained by the above-described method was visually observed under a 30W fluorescent lamp light source. As a result, the case where irregularities analogous to the embossed figures of PVB (irregularities having a diameter of not more than approximately 1 mm), wrinkles, glare, or air was observed in the sample glass is designated as "X", and the case where such was not observed is designated as "○".

In addition, with respect to the evaluation of processability into a curved laminated glass, a laminated glass was fabricated and evaluated according to the above-described method, except that two curved glass sheets were used in place of the two planar glass sheets.

Evaluation of Processability into a Laminated Glass (ii):

The laminated glass obtained by the above-described method was visually observed under a 30W fluorescent lamp light source. As a result, the case where a reflected image into the sample glass was distorted is designated as "x", and the case where a reflected image was not distorted is designated as "○".

(11) Evaluation of Light Fastness:

An irradiation test was carried out by using a metal weather tester, manufactured by Daipla Wintes Co., Ltd. (a type: KW-R5TP-A, light source: water-cooled jacketed metal halide lamp) and a filter KF-1 (transmitted light wavelength: 295 to 780 nm) at an irradiance of 75 mW/cm$^2$ and a black panel temperature of 63° C. without spraying. A light transmittance of the film after the irradiation test was evaluated, and a light transmittance maintenance rate before and after the irradiation, which is expressed by the following equation (3), was evaluated.

Light transmittance maintenance rate=$(Ta/Tb) \times 100$  (3)

(In the foregoing equation, Ta represents a light transmittance after the irradiation; and Tb represents a light transmittance before the irradiation.)

(12) Haze Value:

A haze value of the film was measured using a haze meter, manufactured by Nippon Denshoku Industries Co., Ltd. (NDH-2000) in conformity with JIS K7136.

(13) Refractive Index of Coating Layer:

A coating solution was dried and hardened in a plate state at 90° C. and measured with a laser light at a wavelength of 633 nm by using a refractive index meter (Prism Coupler, manufactured by Metricon Corporation).

Example 1

Polyethylene-2,6-naphthalate (hereinafter referred to as "PEN") having an intrinsic viscosity (in orthochlorophenol at 35° C.) of 0.62 dL/g as a polyester serving for not only a first layer but a protective layer and isophthalic acid-copolymerized polyethylene terephthalate having 12% by mole of isophthalic acid copolymerized therewith (hereinafter referred to as "IA12PET") and having an intrinsic viscosity (in orthochlorophenol at 35° C.) of 0.65 dL/g as a polyester serving for a second layer were prepared, respectively.

Then, the polyester serving for not only the first layer but the protective layer was dried at 180° C. for 5 hours, and the polyester serving for the second layer was dried at 160° C. for 3 hours, and thereafter, the resulting polyesters were supplied into an extruder, respectively. PEN and IA12PET were heated to 300° C. and 280° C. and rendered in a molten state, respectively. The polyester serving for the first layer was branched into 90 layers, and the polyester serving for the second layer was branched into 91 layers; thereafter, these branched layers were laminated by using a multilayer feed block apparatus for laminating a laminated structure portion such that the polyester layer for the first layer and the polyester layer for the second layer were alternately laminated, and a ratio of the maximum layer thickness to the minimum layer thickness in each of the first layer and the second layer continuously changed up to 1.5 times in terms of maximum/minimum and the protective layer on the both surfaces of the laminated structure portion; and the laminate was guided into a die while keeping a laminated state thereof and cast on a casting drum. Then, an unstretched multilayer laminated film having a protective layer composed of a PEN layer on the outermost layer on the both surfaces of the film and having a total layer number of the laminated structure portion of 181 layers was fabricated. Incidentally, with respect to the thickness of each of the laminated structure portion and the protective layer, the supply amount was adjusted such that the thickness after stretching became as shown in Table 2.

This unstretched multilayer laminated film was stretched 4.0 times in the film forming direction at a temperature of 150° C. and further stretched 4.0 times in the width direction at a temperature of 155° C., followed by carrying out a heat set treatment at 230° C. for 3 seconds. Incidentally, the layer structure and the film forming condition are shown in Table 1, the layer structure of the resulting film is shown in Table 2, and the physical properties thereof are shown in Table 3.

Example 2

The same operation as that in Example 1 was repeated, except for changing the stretch ratio to 4.5 times in the film forming direction and 4.5 times in the width direction, respectively as shown in Table 1 and adjusting the thickness of each of the laminated structure portion and the protective layer as shown in Table 2. The layer structure of the resulting film is shown in Table 2, and the physical properties thereof are shown in Table 3.

Examples 3 and 4

The same operation as that in Example 1 was repeated, except for adjusting the thickness of the protective layer as shown in Table 2. The layer structure of each of the resulting films is shown in Table 2, and the physical properties thereof are shown in Table 3.

Example 5

The same operation as that in Example 1 was repeated, except for changing the stretch ratio to 3.5 times in the film forming direction and 3.5 times in the width direction, respectively as shown in Table 1 and adjusting the thickness of each of the laminated structure portion and the protective layer as shown in Table 2. The layer structure of the resulting film is shown in Table 2, and the physical properties thereof are shown in Table 3.

Example 6

The same operation as that in Example 3 was repeated, except for using, as the polyester serving for the second layer, isophthalic acid-copolymerized polyethylene terephthalate having 20% by mole of isophthalic acid copolymerized therewith (hereinafter referred to as "IA20PET") and having an intrinsic viscosity (in orthochlorophenol at 35° C.) of 0.65 dL/g. The layer structure of the resulting film is shown in Table 2, and the physical properties thereof are shown in Table 3.

Example 7

The same operation as that in Example 3 was repeated, except for using, as the polyester serving for the second layer, naphthalenedicarboxylic acid-copolymerized polyethylene terephthalate having 11% by mole of 2,6-naphthalenedicarboxylic acid copolymerized therewith (hereinafter referred to as "NDC11PET") and having an intrinsic viscosity (in orthochlorophenol at 35° C.) of 0.65 dL/g. The layer structure of the resulting film is shown in Table 2, and the physical properties thereof are shown in Table 3.

Examples 8 and 9

The same operation as that in Example 1 was repeated, except for changing the lamination number of each layer of the laminated structure portion and the thickness of the protective layer as shown in Tables 1 and 2. The layer structure of each of the resulting films is shown in Table 2, and the physical properties thereof are shown in Table 3.

Example 10

The same operation as that in Example 2 was repeated, except for carrying out the heat set treatment at a temperature of 170° C. The layer structure of the resulting film is shown in Table 2, and the physical properties thereof are shown in Table 3.

In the present Example, the thermal shrinkage at 120° C. for 30 minutes was 1.2% in the longitudinal direction and 1.2% in the lateral direction, respectively; and similar to the evaluation of the processability into a planar laminated glass, in the evaluation of the processability into a laminated glass using a curved laminated glass, irregularities analogous to the embossed figures of PVB (irregularities having a diameter of not more than approximately 1 mm), wrinkles, glare, and air were not observed, and favorable processability into a laminated glass was obtained. In addition, by using the film of the present Example for a curved laminated glass, more favorable processability into a glass was obtained without causing distortion of an outline reflected on the glass.

Example 11

On one surface of the biaxially stretched laminated film fabricated in Example 1, the following coating agent (I) was coated using a bar coater and then dried, thereby forming an ultraviolet light absorber-containing layer having a thickness of 6.3 µm.

A light irradiation test was carried out by using this laminated film. As a result, the sample of Example 1 had a light transmittance maintenance rate of 80% according to the evaluation method (11). Meanwhile, the sample having an ultraviolet light absorber-containing layer of the present Example had a light transmittance maintenance rate of 98% and was confirmed to have favorable durability against an ultraviolet light.

(Preparation of Coating Agent (I))

8 parts by weight of TINUVIN (manufactured by Ciba) as an organic ultraviolet light absorber, 60 parts by weight of HALSHYBRIDUV-G13 (manufactured by Nippon Shokubai Co., Ltd.) that is an acrylic resin as a binder resin, and 0.6 parts by weight of DESMODUR N3200 (manufactured by Sumika Bayer Urethane Co., Ltd.) as an isocyanate curing agent were dispersed in 31 parts by weight of toluene, thereby preparing a coating agent (I) as a solution having a solid content concentration of 34% by weight and a concentration of the ultraviolet light absorber in the solid content of 12% by weight.

Example 12

The same operation as that in Example 2 was repeated, except for using, as the polyester serving for the second layer, isophthalic acid-copolymerized polyethylene terephthalate (IA11PET) having an intrinsic viscosity of 0.90 dL/g, changing the stretch ratio to 4.0 times in the film forming direction and 4.5 times in the width direction, respectively, and changing the heat set temperature to 170° C. Incidentally, the layer structure and the film forming condition are shown in Table 1, the layer structure of the resulting film is shown in Table 2, and the physical properties thereof are shown in Table 3.

In the present Example, the thermal shrinkage at 120° C. for 30 minutes was 1.1% in the longitudinal direction and 1.2% in the lateral direction, respectively; and similar to the evaluation of the processability into a planar laminated glass, in the evaluation of the processability into a laminated glass using a curved laminated glass, irregularities analogous to the embossed figures of PVB (irregularities having a diameter of not more than approximately 1 mm), wrinkles, glare, and air were not observed, and favorable processability into a laminated glass was obtained. In addition, by using the film of the present Example for a curved laminated glass, more favorable processability into a glass was obtained without causing distortion of an outline reflected on the glass.

Example 13

The same operation as that in Example 12 was repeated, except for changing the heat set temperature to 204° C. as shown in Table 1. The layer structure of the resulting film is shown in Table 2, and the physical properties thereof are shown in Table 3.

In the present Example, the thermal shrinkage at 120° C. for 30 minutes was 0.6% in the longitudinal direction and 0.7% in the lateral direction, respectively; and similar to the evaluation of the processability into a planar laminated glass, in the evaluation of the processability into a laminated glass using a curved laminated glass, irregularities analogous to the embossed figures of PVB (irregularities having a diameter of not more than approximately 1 mm), wrinkles, glare, and air were not observed, and favorable processability into a laminated glass was obtained. In addition, by using the film of the present Example for a curved laminated glass, more favorable processability into a glass was obtained without causing distortion of an outline reflected on the glass.

Example 14

The same operation as that in Example 12 was repeated, except for using, as the polyester serving for the second layer, isophthalic acid/naphthalenedicarboxylic acid-copolymerized polyethylene terephthalate having 26% by mole of isophthalic acid and 9% by mole of 2,6-naphthalenedicarboxylic acid copolymerized therewith (hereinafter referred to as "IA26NDC9PET") and having an intrinsic viscosity (in orthochlorophenol at 35° C.) of 0.70 dL/g, changing the stretch ratio to 4.0 times in the width direction, and changing the heat set temperature to 170° C. as shown in Table 1. The layer structure of the resulting film is shown in Table 2, and the physical properties thereof are shown in Table 3. Since IA26NDC9PET is amorphous, according to the results of DSC measurement, a melting point on the low temperature side is not found, but only a melting point of PEN of the first layer is measured.

In the present Example, the thermal shrinkage at 120° C. for 30 minutes was 1.1% in the longitudinal direction and 1.2% in the lateral direction, respectively; and similar to the evaluation of the processability into a planar laminated glass, in the evaluation of the processability into a laminated glass using a curved laminated glass, irregularities analogous to the embossed figures of PVB (irregularities having a diameter of not more than approximately 1 mm), wrinkles, glare, and air were not observed, and favorable processability into a laminated glass was obtained. In addition, by using the film of the present Example for a curved laminated glass, more favorable processability into a glass was obtained without causing distortion of an outline reflected on the glass.

Comparative Example 1

The same operation as that in Example 1 was repeated, except for adjusting the thickness of the protective layer to 4 µm as shown in Table 2. The layer structure of the resulting film is shown in Table 2, and the physical properties thereof are shown in Table 3.

Comparative Example 2

The same operation as that in Example 9 was repeated, except for using, as the polyester serving for the second layer, a blend obtained by melt mixing terephthalic acid-copolymerized polyethylene-2,6-naphthalate having 8% by mole of terephthalic acid copolymerized therewith (hereinafter referred to as "TA8PEN") and having an intrinsic viscosity (in orthochlorophenol at 35° C.) of 0.62 dL/g and NDC11PET in a weight ratio of 8/2 (hereinafter referred to as "TA27PEN") and adjusting the thickness of the protective layer to 5 μm as shown in Table 2. The layer structure of the resulting film is shown in Table 2, and the physical properties thereof are shown in Table 3.

Comparative Example 3

The same operation as that in Example 3 was repeated, except for using, as the protective layer, the same IA12PET as that in the second layer, branching the polyester serving for the first layer into 91 layers, and branching the polyester serving for the second layer into 90 layers. The layer structure of the resulting film is shown in Table 2, and the physical properties thereof are shown in Table 3.

TABLE 1

| | Protective layer portion | | | First layer | | | Second layer | | | | Stretch ratio | | Heat set |
|---|---|---|---|---|---|---|---|---|---|---|---|---|---|
| | Resin | Layer number | Tg (° C.) | Resin | Layer number | Tg (° C.) | Resin | Layer number | Tg (° C.) | Total layer number | MD Times | TD Times | Temperature ° C. |
| Example 1 | PEN | 2 | 120 | PEN | 90 | 120 | IA12PET | 91 | 74 | 181 | 4.0 | 4.0 | 230 |
| Example 2 | PEN | 2 | 120 | PEN | 90 | 120 | IA12PET | 91 | 74 | 181 | 4.5 | 4.5 | 230 |
| Example 3 | PEN | 2 | 120 | PEN | 90 | 120 | IA12PET | 91 | 74 | 181 | 4.0 | 4.0 | 230 |
| Example 4 | PEN | 2 | 120 | PEN | 90 | 120 | IA12PET | 91 | 74 | 181 | 4.0 | 4.0 | 230 |
| Example 5 | PEN | 2 | 120 | PEN | 90 | 120 | IA12PET | 91 | 74 | 181 | 3.5 | 3.5 | 230 |
| Example 6 | PEN | 2 | 120 | PEN | 90 | 120 | IA20PET | 91 | 72 | 181 | 4.0 | 4.0 | 230 |
| Example 7 | PEN | 2 | 120 | PEN | 90 | 120 | NDC11PET | 91 | 80 | 181 | 4.0 | 4.0 | 230 |
| Example 8 | PEN | 2 | 120 | PEN | 138 | 120 | IA12PET | 139 | 74 | 277 | 4.0 | 4.0 | 230 |
| Example 9 | PEN | 2 | 120 | PEN | 45 | 120 | IA12PET | 46 | 74 | 91 | 4.0 | 4.0 | 230 |
| Example 10 | PEN | 2 | 120 | PEN | 90 | 120 | IA12PET | 91 | 74 | 181 | 4.5 | 4.5 | 170 |
| Example 12 | PEN | 2 | 120 | PEN | 90 | 120 | IA11PET (IV = 0.9) | 91 | 74 | 181 | 4.0 | 4.5 | 170 |
| Example 13 | PEN | 2 | 120 | PEN | 90 | 120 | IA11PET (IV = 0.9) | 91 | 74 | 181 | 4.0 | 4.5 | 204 |
| Example 14 | PEN | 2 | 120 | PEN | 90 | 120 | IA26NDC9PET (IV = 0.7) | 91 | 75 | 181 | 4.0 | 4.0 | 170 |
| Comparative Example 1 | PEN | 2 | 120 | PEN | 90 | 120 | IA12PET | 91 | 74 | 181 | 4.0 | 4.0 | 230 |
| Comparative Example 2 | PEN | 2 | 120 | PEN | 45 | 120 | TA27PEN | 46 | 117 | 91 | 4.0 | 4.0 | 230 |
| Comparative Example 3 | IA12PET | 2 | 74 | PEN | 91 | 120 | IA12PET | 90 | 74 | 181 | 4.0 | 4.0 | 230 |

PEN: Homo PEN
IA12PET: PET having 12% by mole of isophthalic acid copolymerized therewith
IA20PET: PET having 20% by mole of isophthalic acid copolymerized therewith
NDC11PET: PET having 11% by mole of 2,6-naphthalenedicarboxylic acid copolymerized therewith
TA27PEN: Blend of TA8PEN and NDC11PET in a weight ratio of 8/2
IA26NDC9PET: PET having 26% by mole of isophthalic acid and 9% by mole of 2,6-naphthalenedicarboxylic acid copolymerized therewith

TABLE 2

| | Film layer structure | | | | | | |
|---|---|---|---|---|---|---|---|
| | | Laminated structure portion | | | | | |
| | | Protective layer | | Minimum thickness | | Maximum thickness | |
| | Whole | Thickness | | | Second | | Second |
| | thickness μm | Surface A μm | Surface D μm | First layer nm | layer nm | First layer nm | layer nm | Thickness μm |
| Example 1 | 36 | 5 | 5 | 114 | 127 | 171 | 190 | 26 |
| Example 2 | 46 | 10 | 10 | 114 | 127 | 171 | 190 | 26 |
| Example 3 | 46 | 10 | 10 | 114 | 127 | 171 | 190 | 26 |
| Example 4 | 56 | 15 | 15 | 114 | 127 | 171 | 190 | 26 |
| Example 5 | 46 | 10 | 10 | 114 | 127 | 171 | 190 | 26 |
| Example 6 | 46 | 10 | 10 | 114 | 127 | 171 | 190 | 26 |
| Example 7 | 46 | 10 | 10 | 114 | 127 | 171 | 190 | 26 |
| Example 8 | 60 | 10 | 10 | 114 | 127 | 171 | 190 | 40 |

TABLE 2-continued

| | Film layer structure | | | | | | | |
|---|---|---|---|---|---|---|---|---|
| | | Protective layer | | Laminated structure portion | | | | |
| | | | | Minimum thickness | | Maximum thickness | | |
| | Whole thickness μm | Thickness | | First layer nm | Second layer nm | First layer nm | Second layer nm | Thickness μm |
| | | Surface A μm | Surface D μm | | | | | |
| Example 9 | 33 | 10 | 10 | 114 | 127 | 171 | 190 | 13 |
| Example 10 | 46 | 10 | 10 | 114 | 127 | 171 | 190 | 26 |
| Example 12 | 46 | 5 | 5 | 114 | 127 | 171 | 190 | 26 |
| Example 13 | 46 | 10 | 10 | 114 | 127 | 171 | 190 | 26 |
| Example 14 | 46 | 10 | 10 | 114 | 127 | 171 | 190 | 26 |
| Comparative Example 1 | 34 | 4 | 4 | 114 | 127 | 171 | 190 | 26 |
| Comparative Example 2 | 23 | 5 | 5 | 114 | 127 | 171 | 190 | 13 |
| Comparative Example 3 | 46 | 10 | 10 | 114 | 127 | 171 | 190 | 26 |

TABLE 3

| | Physical properties of film | | | | | | | |
|---|---|---|---|---|---|---|---|---|
| | Optical properties | | | | | Results of DSC measurement | | |
| | Average reflectance | | | | | | Melting point on the low | Melting point on the high |
| | 800 to 1,200 nm % | 400 to 750 nm % | Solar transmittance % | Visible light transmittance % | Haze % | Crystallization peak °C. | temperature side °C. | temperature side °C. |
| Example 1 | 77 | 17 | 67 | 85 | — | 130 | 224 | 262 |
| Example 2 | 77 | 17 | 67 | 85 | — | 130 | 224 | 262 |
| Example 3 | 77 | 17 | 67 | 85 | — | 130 | 224 | 262 |
| Example 4 | 77 | 17 | 67 | 85 | — | 130 | 224 | 262 |
| Example 5 | 69 | 17 | 70 | 86 | — | 130 | 224 | 262 |
| Example 6 | 81 | 18 | 63 | 85 | — | — | — | 262 |
| Example 7 | 70 | 18 | 69 | 85 | — | 146 | 222 | 262 |
| Example 8 | 85 | 17 | 63 | 80 | — | 130 | 224 | 262 |
| Example 9 | 60 | 18 | 74 | 83 | — | 130 | 224 | 262 |
| Example 10 | 61 | 15 | 74 | 92 | 1.5 | — | 224 | 262 |
| Example 12 | 61 | 15 | 74 | 92 | 0.7 | — | 224 | 262 |
| Example 13 | 61 | 15 | 74 | 92 | 0.4 | — | 224 | 262 |
| Example 14 | 65 | 17 | 72 | 87 | 0.3 | — | — | 262 |
| Comparative Example 1 | 77 | 17 | 67 | 85 | — | 130 | 224 | 262 |
| Comparative Example 2 | 37 | 18 | 80 | 82 | — | 126 | 213 | 262 |
| Comparative Example 3 | 77 | 10 | 67 | 90 | — | 130 | 224 | 262 |

| | Physical properties of film | | | | |
|---|---|---|---|---|---|
| | Measurement of dynamic viscoelasticity | | | | Evaluation of processability into a laminated |
| | Tg on the low temperature side °C. | Tg on the high temperature side °C. | Young's modulus (at 90° C.) | | glass (i) (planar sheet) |
| | | | MD GPa | TD GPa | |
| Example 1 | 78 | 149 | 2.5 | 2.5 | ○ |
| Example 2 | 78 | 149 | 3.0 | 3.0 | ○ |
| Example 3 | 78 | 149 | 2.9 | 2.9 | ○ |
| Example 4 | 78 | 149 | 3.5 | 3.5 | ○ |
| Example 5 | 78 | 149 | 2.8 | 2.9 | ○ |
| Example 6 | 76 | 149 | 2.9 | 2.9 | ○ |

TABLE 3-continued

| | | | | | |
|---|---|---|---|---|---|
| Example 7 | 84 | 149 | 2.9 | 2.9 | ○ |
| Example 8 | 78 | 149 | 2.9 | 2.9 | ○ |
| Example 9 | 78 | 149 | 2.9 | 2.9 | ○ |
| Example 10 | 78 | 149 | 2.4 | 2.8 | ○ |
| Example 12 | 78 | 149 | 2.2 | 2.6 | ○ |
| Example 13 | 78 | 149 | 2.3 | 2.7 | ○ |
| Example 14 | 79 | 149 | 2.2 | 2.6 | ○ |
| Comparative Example 1 | 78 | 149 | 2.3 | 2.3 | X |
| Comparative Example 2 | 117 | 149 | 2.9 | 2.9 | ○ |
| Comparative Example 3 | 78 | 149 | 2.1 | 2.1 | X |

Example 15

Polyethylene-2,6-naphthalendicarboxylate (PEN) having an intrinsic viscosity (in orthochlorophenol at 35° C.) of 0.62 dL/g as a polyester serving for a first layer and isophthalic acid-copolymerized polyethylene terephthalate having 12% by mole of isophthalic acid copolymerized therewith (IA12PET) and having an intrinsic viscosity (in orthochlorophenol at 35° C.) of 0.65 dL/g as a polyester serving for a second layer were prepared, respectively. Then, the polyester serving for the first layer was dried at 180° C. for 5 hours, and the polyester serving for the second layer was dried at 160° C. for 3 hours, and thereafter, the resulting polyesters were supplied into a separate extruder, respectively, and PEN and IA12PET were heated to 300° C. and 280° C. and rendered in a molten state, respectively.

The polyester serving for the first layer was branched into 72 layers, and the polyester serving for the second layer was branched into 71 layers; thereafter, these branched layers were laminated by using a multilayer feed block apparatus for alternately laminating the polyester layer for the first layer and the polyester layer for the second layer; and the laminate was guided into a die while keeping a laminated state thereof and cast on a casting drum. On that occasion, the thickness of each layer of the feed block was adjusted so as to have a thickness of the film and a thickness of each layer after stretching as shown in Table 5; the thickness of each layer in the alternately laminated portion was adjusted such that it became gradually thick toward the thickness direction of the film; and each of the two layers to be disposed as the outermost layer of the first layer was adjusted such that its thickness as the protective layer was 15% relative to the whole thickness. Thus, an unstretched laminated film having a total layer number of the laminated portion of 141 layers excluding the protective layers was fabricated.

This unstretched laminated film was stretched 4.5 times in the film forming direction (longitudinal direction) at a temperature of 150° C. and further stretched 4.5 times in the lateral direction at a temperature of 155° C., followed by carrying out a heat treatment at 230° C. for 3 seconds. Incidentally, the layer structure and the film forming condition are shown in Table 4, the structure of the resulting biaxially stretched laminated film is shown in Table 5, and the physical properties thereof are shown in Table 6.

Example 16

PEN as a polyester serving for a first layer and a blend obtained by blending copolymerized polyethylene naphthalene dicarboxylate having 8% by mole of terephthalic acid copolymerized therewith (hereinafter referred to as "TA8PEN" and having an intrinsic viscosity (in orthochlorophenol at 35° C.) of 0.63 dL/g and copolymerized polyethylene terephthalate having 11% by moles of 2,6-naphthalenedicarboxylic acid copolymerized therewith (hereinafter referred to as "NDC11PET") and having an intrinsic viscosity (in orthochlorophenol at 35° C.) of 0.63 dL/g in a weight ratio of 6/4 (hereinafter referred to as "TA44PEN") as a polyester serving for a second layer were prepared, respectively. Then, the polyester serving for the first layer was dried at 180° C. for 5 hours, and the polyester serving for the second layer was dried at 160° C. for 3 hours, and thereafter, the resulting polyesters were supplied into a separate extruder, respectively, and PEN and the mixed resin were heated to 300° C. and rendered in a molten state, respectively. The polyester serving for the first layer was branched into 72 layers, and the polyester serving for the second layer was branched into 71 layers; thereafter, these branched layers were laminated by using a multilayer feed block apparatus for alternately laminating the polyester layer for the first layer and the polyester layer for the second layer; and the laminate was guided into a die while keeping a laminated state thereof and cast on a casting drum.

On that occasion, the thickness of each layer of the feed block was adjusted so as to have a thickness of the film and a thickness of each layer after stretching as shown in Table 5; the thickness of each layer in the alternately laminated portion was adjusted such that it became gradually thick toward the thickness direction of the film; and each of the two layers to be disposed as the outermost layer of the first layer was adjusted such that its thickness as the protective layer was 15% relative to the whole thickness. Thus, an unstretched laminated film having a total layer number of the laminated portion of 141 layers excluding the protective layers was fabricated.

This unstretched laminated film was stretched 4.5 times in the film forming direction (longitudinal direction) at a temperature of 150° C. and further stretched 4.5 times in the lateral direction at a temperature of 155° C., followed by carrying out a heat treatment at 230° C. for 3 seconds. Incidentally, the layer structure and the film forming condition are shown in Table 4, the structure of the resulting biaxially stretched laminated film is shown in Table 5, and the physical properties thereof are shown in Table 6.

Example 17

The same operation as that in Example 16 was repeated, except for changing the stretch ratio to 4.0 times in the film forming direction and 4.0 times in the lateral direction, respectively as shown in Table 4. The structure of the resulting biaxially stretched laminated film is shown in Table 5, and the physical properties thereof are shown in Table 6.

Example 18

The same operation as that in Example 16 was repeated, except for using, as the polyester serving for the second layer, a blend obtained by blending TA8PEN and NDC11PET in a weight ratio of 8/2 (hereinafter referred to as "TA27PEN") and changing the stretch ratio to 4.0 times in the film forming direction and 4.0 times in the lateral direction, respectively as shown in Table 4. The structure of the resulting biaxially stretched laminated film is shown in Table 5, and the physical properties thereof are shown in Table 6.

Example 19

The same operation as that in Example 15 was repeated, except for using 138 layers for the first layer and 139 layers for the second layer of the laminated portion, thereby changing the total layer number of the alternately laminated portion to 277 layers as shown in Table 4 and adjusting the proportion of each of the protective layers composed of the polyester serving for the first layer to be formed on the both surfaces of the alternately laminated portion to 9% relative to the whole thickness of the film. The structure of the resulting biaxially stretched laminated film is shown in Table 5, and the physical properties thereof are shown in Table 6.

Example 20

The same operation as that in Example 15 was repeated, except for using 415 layers for the first layer and 416 layers for the second layer of the laminated portion, thereby changing the total layer number of the alternately laminated portion to 831 layers as shown in Table 4 and adjusting the proportion of each of the protective layers composed of the polyester serving for the first layer to be formed on the both surfaces of the alternately laminated portion to 3% relative to the whole thickness of the film. The structure of the resulting biaxially stretched laminated film is shown in Table 5, and the physical properties thereof are shown in Table 6.

Example 21

The same operation as that in Example 16 was repeated, except for using 138 layers for the first layer and 139 layers for the second layer of the laminated portion, thereby changing the total layer number of the alternately laminated portion to 277 layers as shown in Table 4 and adjusting the proportion of the protective layers composed of the polyester serving for the first layer to be formed on the both surfaces of the alternately laminated portion to 9% relative to the whole thickness of the film. The structure of the resulting biaxially stretched laminated film is shown in Table 5, and the physical properties thereof are shown in Table 6.

Example 22

The same operation as that in Example 16 was repeated, except for using 415 layers for the first layer and 416 layers for the second layer of the laminated portion, thereby changing the total layer number of the alternately laminated portion to 831 layers as shown in Table 4 and adjusting the proportion of each of the protective layers composed of the polyester serving for the first layer to be formed on the both surfaces of the alternately laminated portion to 3% relative to the whole thickness of the film. The structure of the resulting biaxially stretched laminated film is shown in Table 5, and the physical properties thereof are shown in Table 6.

Example 23

The same operation as that in Example 21 was repeated, except for carrying out the heat set treatment at a temperature of 170° C. as shown in Table 4. The structure of the resulting biaxially stretched laminated film is shown in Table 5, and the physical properties thereof are shown in Table 6.

In the present Example, the thermal shrinkage at 120° C. for 30 minutes was 1.2% in the longitudinal direction and 1.2% in the lateral direction, respectively; and similar to the evaluation of the processability into a planar laminated glass, in the evaluation of the processability into a laminated glass using a curved laminated glass, irregularities analogous to the embossed figures of PVB (irregularities having a diameter of not more than approximately 1 mm), wrinkles, glare, and air were not observed, and favorable processability into a laminated glass was obtained. In addition, by using the film of the present Example for a curved laminated glass, more favorable processability into a glass was obtained without causing distortion of an outline reflected on the glass.

Example 24

On one surface of the biaxially stretched laminated film fabricated in Example 15, the following coating agent (I) was coated using a bar coater and then dried, thereby forming an ultraviolet light absorber-containing layer having a thickness of 6.3 µm.

A light irradiation test was carried out by using this laminated film. As a result, the sample of Example 15 had a light transmittance maintenance rate of 80% according to the evaluation method (11). Meanwhile, the sample having an ultraviolet light absorber-containing layer of the present Example had a light transmittance maintenance rate of 98% and was confirmed to have favorable durability against an ultraviolet light.

(Preparation of Coating Agent (I))

8 parts by weight of TINUVIN (manufactured by Ciba) as an organic ultraviolet light absorber, 60 parts by weight of HALSHYBRID UV-G13 (manufactured by Nippon Shokubai Co., Ltd.) that is an acrylic resin as a binder resin, and 0.6 parts by weight of DESMODUR N3200 (manufactured by Sumika Bayer Urethane Co., Ltd.) as an isocyanate curing agent were dispersed in 31 parts by weight of toluene, thereby preparing a coating agent (I) as a solution having a solid content concentration of 34% by weight and a concentration of the ultraviolet light absorber in the solid content of 12% by weight.

Comparative Example 4

PEN as a polyester serving for a first layer and IA12PET as a polyester serving for a second layer were prepared, respectively. Then, the polyester serving for the first layer was dried at 180° C. for 3 hours, and the polyester serving for the second layer was dried at 160° C. for 3 hours, and thereafter, the resulting polyesters were supplied into a separate extruder, respectively, and PEN and IA12PET were heated to 300° C. and 280° C. and rendered in a molten state, respectively. The polyester serving for the first layer was branched into 140 layers, and the polyester serving for the second layer was branched into 139 layers; thereafter, these branched layers were laminated by using a multilayer feed block apparatus for alternately laminating the polyester layer for the first layer and the polyester layer for the second layer; and the laminate was guided into a die while keeping a laminated state thereof and cast on a casting drum.

On that occasion, the thickness of each layer of the feed block was adjusted so as to have a thickness of the film and a thickness of each layer after stretching as shown in Table 5; the thickness of each layer in the alternately laminated portion was adjusted such that it became gradually thick toward the thickness direction of the film; and each of the two layers to be disposed as the outermost layer of the first layer was adjusted such that its thickness as the protective layer was 9% relative to the whole thickness. Thus, an unstretched laminated film having a total layer number of the laminated structure portion of 277 layers excluding the protective layers was fabricated.

This unstretched laminated film was stretched 3.5 times in the film forming direction at a temperature of 150° C. and further stretched 4.0 times in the lateral direction at a temperature of 155° C., followed by carrying out a heat treatment at 230° C. for 3 seconds. Incidentally, the layer structure and the film forming condition are shown in Table 4, the layer structure of the resulting biaxially stretched laminated film is shown in Table 5, and the physical properties thereof are shown in Table 6.

In the film of the present Comparative Example, the optical thickness ratio was out of 1.0, the ratio of the minim thickness and the maximum thickness was large, and a third-order reflection peak was generated in a visible region, and therefore, the reflectance in the visible light wavelength region was high, and sufficient transparency was not obtained. In addition, the Young's modulus properties were not sufficient, and the processability into a laminated glass was lowered.

Comparative Example 5

The same operation as that in Example 15 was repeated, except for changing the stretch ratio to 3.5 times in the film forming direction and 4.0 times in the lateral direction, respectively as shown in Table 4. The structure of the resulting biaxially stretched laminated film is shown in Table 5, and the physical properties thereof are shown in Table 6.

Comparative Example 6

The same operation as that in Example 15 was repeated, except for using 15 layers for the first layer and 16 layers for the second layer of the laminated portion, thereby changing the total layer number of the alternately laminated portion to 31 layers as shown in Table 4 and adjusting the proportion of each of the protective layers composed of the polyester serving for the first layer to be formed on the both surfaces of the alternately laminated portion to 32% relative to the whole thickness of the film. The structure of the resulting biaxially stretched laminated film is shown in Table 5, and the physical properties thereof are shown in Table 6.

Comparative Example 7

Polyethylene terephthalate (hereinafter referred to as "PET") having an intrinsic viscosity (in orthochlorophenol at 35° C.) as a polyester serving for a first layer and IA12PET as a polyester serving for a second layer were prepared, respectively. Then, the polyester serving for the first layer was dried at 170° C. for 3 hours, and the polyester serving for the second layer was dried at 160° C. for 3 hours, and thereafter, the resulting polyesters were supplied into a separate extruder, respectively, and the polyesters were heated to 280° C. and rendered in a molten state, respectively. The polyester serving for the first layer was branched into 139 layers, and the polyester serving for the second layer was branched into 138 layers; thereafter, these branched layers were laminated by using a multilayer feed block apparatus for alternately laminating the polyester layer for the first layer and the polyester layer for the second layer; and the laminate was guided into a die while keeping a laminated state thereof and cast on a casting drum.

On that occasion, the thickness of each layer of the feed block was adjusted so as to have a thickness of the film and a thickness of each layer after stretching as shown in Table 5, and such that the thickness of each layer in the alternately laminated portion became gradually thick toward the thickness direction of the film. Thus, an unstretched laminated film having a total layer number of the laminated structure portion of 277 layers was fabricated.

This unstretched laminated film was stretched 4.0 times in the film forming direction at a temperature of 90° C. and further stretched 4.0 times in the lateral direction at a temperature of 95° C., followed by carrying out a heat treatment at 230° C. for 3 seconds. Incidentally, the layer structure and the film forming condition are shown in Table 4, the structure of the resulting biaxially stretched laminated film is shown in Table 5, and the physical properties thereof are shown in Table 6.

Comparative Example 8

PET as a polyester serving for a first layer and TA44PEN as a polyester serving for a second layer were prepared, respectively. Then, the polyester serving for the first layer was dried at 170° C. for 3 hours, and the polyester serving for the second layer was dried at 160° C. for 3 hours, and thereafter, the resulting polyesters were supplied into a separate extruder, respectively, and PET and TA44PEN were heated to 280° C. and 300° C. and rendered in a molten state, respectively. The polyester serving for the first layer was branched into 72 layers, and the polyester serving for the second layer was branched into 71 layers; thereafter, these branched layers were laminated by using a multilayer feed block apparatus for alternately laminating the polyester layer for the first layer and the polyester layer for the second layer; and the laminate was guided into a die while keeping a laminated state thereof and cast on a casting drum.

On that occasion, the thickness of each layer of the feed block was adjusted so as to have a thickness of the film and a thickness of each layer after stretching as shown in Table 5; the thickness of each layer in the alternately laminated portion was adjusted such that it became gradually thick toward the thickness direction of the film; and each of the two layers to be disposed as the outermost layer of the first layer was adjusted such that its thickness as the protective layer was 15% relative to the whole thickness. Thus, an unstretched laminated film having a total layer number of the laminated structure portion of 141 layers excluding the protective layers was fabricated.

This unstretched laminated film was stretched 4.0 times in the film forming direction at a temperature of 100° C. and further stretched 4.0 times in the lateral direction at a temperature of 105° C., followed by carrying out a heat treatment at 230° C. for 3 seconds. Incidentally, the layer structure and the film forming condition are shown in Table 4, the layer structure of the resulting biaxially stretched laminated film is shown in Table 5, and the physical properties thereof are shown in Table 6.

TABLE 4

| | Resin | Protective layer portion Proportion to the whole thickness (%) Surface A side | Protective layer portion Proportion to the whole thickness (%) Surface D side | Protective layer portion Proportion to the whole thickness (%) Whole | Laminated portion First layer Resin | Laminated portion First layer Layer number | Laminated portion Second layer Resin | Laminated portion Second layer Layer number | Total layer number | Stretch ratio MD Times | Stretch ratio TD Times | Heat set Temperature ° C. |
|---|---|---|---|---|---|---|---|---|---|---|---|---|
| Example 15 | PEN | 11 | 11 | 21 | PEN | 70 | IA12PET | 71 | 141 | 4.5 | 4.5 | 230 |
| Example 16 | PEN | 11 | 11 | 21 | PEN | 70 | TA44PEN | 71 | 141 | 4.5 | 4.5 | 220 |
| Example 17 | PEN | 11 | 11 | 21 | PEN | 70 | TA44PEN | 71 | 141 | 4.0 | 4.0 | 220 |
| Example 18 | PEN | 11 | 11 | 21 | PEN | 70 | TA27PEN | 71 | 141 | 4.0 | 4.0 | 230 |
| Example 19 | PEN | 6 | 6 | 12 | PEN | 139 | IA12PET | 138 | 277 | 4.5 | 4.5 | 230 |
| Example 20 | PEN | 2 | 2 | 4 | PEN | 416 | IA12PET | 415 | 831 | 4.5 | 4.5 | 230 |
| Example 21 | PEN | 6 | 6 | 12 | PEN | 139 | TA44PEN | 138 | 277 | 4.5 | 4.5 | 230 |
| Example 22 | PEN | 2 | 2 | 4 | PEN | 416 | TA44PEN | 415 | 831 | 4.5 | 4.5 | 230 |
| Example 23 | PEN | 6 | 6 | 12 | PEN | 139 | TA44PEN | 138 | 277 | 4.5 | 4.5 | 170 |
| Comparative Example 4 | PEN | 8 | 8 | 16 | PEN | 139 | IA12PET | 138 | 277 | 3.5 | 4.0 | 230 |
| Comparative Example 5 | PEN | 11 | 11 | 21 | PEN | 70 | IA12PET | 71 | 141 | 3.5 | 4.0 | 230 |
| Comparative Example 6 | PEN | 27 | 27 | 55 | PEN | 15 | IA12PET | 16 | 31 | 4.5 | 4.5 | 230 |
| Comparative Example 7 | PET | 0 | 0 | 0 | PET | 139 | IA12PET | 138 | 277 | 4.0 | 4.0 | 230 |
| Comparative Example 8 | PET | 11 | 11 | 21 | PET | 70 | TA44PEN | 71 | 141 | 4.0 | 4.0 | 230 |

TABLE 5

| | Whole thickness μm | Protective layer Surface A μm | Protective layer Surface D μm | Minimum layer First layer nm | Minimum layer Second layer nm | Maximum thickness First layer nm | Maximum thickness Second layer nm |
|---|---|---|---|---|---|---|---|
| Example 15 | 28 | 3 | 3 | 123 | 138 | 170 | 192 |
| Example 16 | 28 | 3 | 3 | 122 | 132 | 194 | 210 |
| Example 17 | 28 | 3 | 3 | 122 | 132 | 194 | 210 |
| Example 18 | 28 | 3 | 3 | 122 | 132 | 194 | 210 |
| Example 19 | 49 | 3 | 3 | 123 | 138 | 170 | 192 |
| Example 20 | 135 | 3 | 3 | 123 | 138 | 170 | 192 |
| Example 21 | 49 | 3 | 3 | 118 | 123 | 165 | 171 |
| Example 22 | 135 | 3 | 3 | 118 | 123 | 165 | 171 |
| Example 23 | 49 | 3 | 3 | 118 | 123 | 165 | 171 |
| Comparative Example 4 | 51 | 4 | 4 | 93 | 101 | 203 | 171 |
| Comparative Example 5 | 28 | 3 | 3 | 123 | 138 | 170 | 192 |
| Comparative Example 6 | 11 | 3 | 3 | 123 | 138 | 170 | 192 |
| Comparative Example 7 | 43 | 0 | 0 | 123 | 138 | 170 | 192 |
| Comparative Example 8 | 28 | 3 | 3 | 120 | 120 | 168 | 168 |

TABLE 6

| | Optical properties Average reflectance 800 to 1,200 nm % | Optical properties Average reflectance 400 to 750 nm % | Optical properties Solar transmittance % | Optical properties Visible light transmittance % | Measurement of dynamic viscoelasticity Tg on the low temperature side ° C. | Measurement of dynamic viscoelasticity Tg on the high temperature side ° C. | Young's modulus (at 20° C.) MD GPa | Young's modulus (at 20° C.) TD GPa |
|---|---|---|---|---|---|---|---|---|
| Example 15 | 79 | 13 | 68 | 89 | 78 | 149 | 5.2 | 5.2 |
| Example 16 | 54 | 15 | 72 | 86 | 107 | 149 | 4.8 | 4.9 |
| Example 17 | 54 | 15 | 72 | 86 | 107 | 149 | 4.7 | 4.9 |
| Example 18 | 54 | 15 | 72 | 86 | 117 | 149 | 4.7 | 4.9 |
| Example 19 | 90 | 14 | 64 | 87 | 78 | 149 | 5.2 | 5.2 |

TABLE 6-continued

| | | | | | | | | |
|---|---|---|---|---|---|---|---|---|
| Example 20 | 93 | 13 | 61 | 88 | 78 | 149 | 5.2 | 5.2 |
| Example 21 | 62 | 14 | 74 | 85 | 107 | 149 | 4.8 | 4.9 |
| Example 22 | 86 | 12 | 65 | 84 | 107 | 149 | 4.8 | 4.9 |
| Example 23 | 50 | 14 | 75 | 83 | 107 | 149 | 4.8 | 4.9 |
| Comparative Example 4 | 76 | 50 | 41 | 52 | 78 | 149 | 4.5 | 4.6 |
| Comparative Example 5 | 68 | 20 | 68 | 83 | 78 | 149 | 4.9 | 4.9 |
| Comparative Example 6 | 41 | 13 | 81 | 89 | 78 | 149 | 5.2 | 5.2 |
| Comparative Example 7 | 71 | 11 | 72 | 92 | 78 | 116 | 4.3 | 5.0 |
| Comparative Example 8 | 23 | 12 | 86 | 87 | 107 | 116 | 4.3 | 5.0 |

| | Young's modulus (at 90° C.) | | Thermal shrinkage (at 120° C. for 30 minutes) | | DSC properties | | | Evaluation of processability into a laminated glass (i) (planar sheet) |
|---|---|---|---|---|---|---|---|---|
| | MD GPa | TD GPa | MD % | TD % | Crystallization peak ° C. | Melting point on the low temperature side ° C. | Melting point on the high temperature side ° C. | |
| Example 15 | 2.4 | 2.4 | 0.6 | 0.6 | 126 | 225 | 260 | ○ |
| Example 16 | 2.9 | 2.9 | 0.7 | 0.6 | 173 | 208 | 257 | ○ |
| Example 17 | 2.8 | 2.8 | 0.4 | 0.4 | 173 | 208 | 257 | ○ |
| Example 18 | 2.9 | 2.9 | 0.4 | 0.4 | 153 | 213 | 258 | ○ |
| Example 19 | 2.4 | 2.4 | 0.4 | 0.4 | 126 | 225 | 260 | ○ |
| Example 20 | 2.4 | 2.4 | 0.4 | 0.4 | 126 | 225 | 260 | ○ |
| Example 21 | 2.9 | 2.9 | 0.4 | 0.4 | 173 | 208 | 257 | ○ |
| Example 22 | 2.9 | 2.9 | 0.4 | 0.4 | 173 | 208 | 257 | ○ |
| Example 23 | 2.9 | 2.9 | 1.2 | 1.2 | — | 208 | 257 | ○ |
| Comparative Example 4 | 1.7 | 1.5 | 0.5 | 0.2 | 126 | 225 | 260 | X |
| Comparative Example 5 | 2.3 | 2.3 | 0.4 | 0.5 | 126 | 225 | 260 | X |
| Comparative Example 6 | 2.4 | 2.4 | 0.4 | 0.4 | 126 | 225 | 260 | ○ |
| Comparative Example 7 | 1.6 | 1.9 | 0.8 | 0.8 | 121 | 225 | 251 | X |
| Comparative Example 8 | 1.6 | 1.9 | 0.8 | 0.8 | 173 | 208 | 251 | X |

Example 25

Polyethylene-2,6-naphthalate (PEN) having an intrinsic viscosity (in orthochlorophenol at 35° C.) of 0.62 dL/g as a polyester serving for not only a first layer but a protective layer and isophthalic acid-copolymerized polyethylene terephthalate having 12% by mole of isophthalic acid copolymerized therewith (IA12PET) and having an intrinsic viscosity (in orthochlorophenol at 35° C.) of 0.65 dL/g as a polyester serving for a second layer were prepared, respectively.

Then, the polyester serving for not only the first layer but the protective layer was dried at 180° C. for 5 hours, and the polyester serving for the second layer was dried at 160° C. for 3 hours, and thereafter, the resulting polyesters were supplied into an extruder, respectively. PEN and IA12PET were heated to 300° C. and 280° C. and rendered in a molten state, respectively. The polyester serving for the first layer was branched into 90 layers, and the polyester serving for the second layer was branched into 91 layers; thereafter, these branched layers were laminated by using a multilayer feed block apparatus for laminating a laminated structure portion such that the polyester layer for the first layer and the polyester layer for the second layer were alternately laminated, and a ratio of the maximum layer thickness to the minimum layer thickness in each of the first layer and the second layer continuously changed up to 1.5 times in terms of maximum/minimum and the protective layer on the both surfaces of the laminated structure portion; and the laminate was guided into a die while keeping a laminated state thereof and cast on a casting drum. Then, an unstretched multilayer laminated film having a protective layer composed of a PEN layer on the outermost layer on the both surfaces of the film and having a total layer number of the laminated structure portion of 181 layers was fabricated. Incidentally, with respect to the thickness of each of the laminated structure portion and the protective layer, the supply amount was adjusted such that the thickness after stretching became as shown in Table 7.

This unstretched multilayer laminated film was stretched 4.5 times in the film forming direction at a temperature of 150° C., and an aqueous coating solution of a coating agent shown in Table 8 having a concentration of 6% was uniformly coated on the both surfaces thereof by using a roll coater. Subsequently, the resultant was supplied into a tenter, stretched 4.5 times in the width direction at a temperature of 155° C., and subsequently subjected to a heat set treatment at 204° C. for 3 seconds. The properties of the resulting film are shown in Table 8.

<Coating Agent Component>
(Polyester C)

A polyester C is constituted of, as an acid component, 90% by mole of 2,6-naphthalenedicarboxylic acid/6% by mole of isophthalic acid/4% by mole of 5-sodium sulfoisophthalic acid and, as a diol component, 25% by mole of ethylene glycol/60% by mole of 9,9-bis[4-(2-hydroxyethoxy)phenyl]fluorene/15% by mole of diethylene glycol (Tg=115° C.).

Such a polyester C was produced in the following manner. That is, 100 parts of dimethyl 2,6-naphthalenedicarboxylate, 5.3 parts of dimethyl isophthalate, 5.4 parts of dimethyl 5-sodium sulfoisophthalate, 45 parts of ethylene glycol, and 78.3 parts of 9,9-bis(4-(-hydroxyethoxy)phenyl)fluorene were charged into an ester interchange reactor, to which was then added 0.1 parts of tetrabutoxy titanium, the contents were heated under a nitrogen atmosphere by controlling the temperature at 230° C., and formed methanol was distilled off, thereby achieving an ester interchange reaction.

Subsequently, 0.5 parts of IRGANOX 1010 (manufactured by Ciba-Geigy) was added to this reaction system; the temperature was gradually increased to 255° C.; the inside of the system was evacuated to 1 mmHg to carry out a polycondensation reaction while removing an excess of the ethylene glycol, thereby obtaining a copolymerized polyester C having an intrinsic viscosity of 0.48 dL/g.

20 parts of this copolymerized polyester C was dissolved in 80 parts of tetrahydrofuran, and 180 parts of water was dropped in the resulting solution under a high-speed stirring of 10,000 rpm, thereby obtaining a bluish milky white dispersion. Subsequently, this dispersion was distilled under a reduced pressure of 20 mmHg, thereby distilling off the tetrahydrofuran. There was thus obtained a polyester water dispersion having a solid content concentration of 10 wt %.

(Polyester D)

A polyester D is constituted of, as an acid component, 97% by mole of terephthalic acid/1% by mole of isophthalic acid/2% by mole of 5-sodium sulfoisophthalic acid and, as a diol component, 60% by mole of ethylene glycol/40% by mole of bisphenol A (Tg=70° C.).

Such a polyester D was produced in the following manner. That is, 100 parts of dimethyl terephthalate, 3 parts of dimethyl isophthalate, 1 part of dimethyl 5-sodium sulfoisophthalate, 26 parts of ethylene glycol, and 14 parts of a bisphenol A-propylene oxide adduct were charged into an ester interchange reactor, to which was then added 0.1 parts of tetrabutoxy titanium, the contents were heated under a nitrogen atmosphere by controlling the temperature at 230° C., and formed methanol was distilled off, thereby achieving an ester interchange reaction.

Subsequently, 0.5 parts of IRGANOX 1010 (manufactured by Ciba-Geigy) was added to this reaction system; the temperature was gradually increased to 255° C.; the inside of the system was evacuated to 1 mmHg to carry out a polycondensation reaction, thereby obtaining a copolymerized polyester D having an intrinsic viscosity of 0.48 dL/g.

20 parts of this copolymerized polyester D was dissolved in 80 parts of tetrahydrofuran, and 180 parts of water was dropped in the resulting solution under a high-speed stirring of 10,000 rpm, thereby obtaining a bluish milky white dispersion. Subsequently, this dispersion was distilled under a reduced pressure of 20 mmHg, thereby distilling off the tetrahydrofuran. There was thus obtained a polyester water dispersion having a solid content concentration of 10 wt %.

(Acrylic Resin)

An acrylic resin is constituted of 30% by mole of methyl methacrylate/30% by mole of 2-isopropenyl-2-oxazoline/10% by mole of polyethylene oxide (n=10) methacrylate/30% by mole of acrylamide (Tg=50° C., molecular weight: 350,000, refractive index: 1.50, density: 1.2 g/cm$^3$).

Such an acrylic resin was produced in the following manner. That is, a four-necked flask was charged with 302 parts of ion-exchanged water; the temperature was increased to 60° C. in a nitrogen gas stream; subsequently, 0.5 parts of ammonium persulfate and 0.2 parts of sodium bisulfite were added as polymerization initiators; and furthermore, a mixture of 23.3 parts of methyl methacrylate, 22.6 parts of 2-isopropenyl-2-oxazoline, 40.7 parts of polyethylene oxide (n=10) methacrylate, and 13.3 parts of acrylamide as monomers was dropped over 3 hours while adjusting a liquid temperature to 60 to 70° C. Even after completion of dropping, the reaction was continued with stirring while keeping the same temperature range for 2 hours, and subsequently, the resultant was cooled to obtain an acrylic water dispersion having a solid content of 25%.

(Organic Particle 1)

Acrylic filler (average particle diameter: 100 nm, refractive index: 1.50, density: 1.2 g/cm$^3$) (MX-100W, manufactured by Nippon Shokubai Co., Ltd.)

(Surfactant)

Polyoxyethylene (n=7) lauryl ether (manufactured by Sanyo Chemical Industries, Ltd., a trade name: NAROACTY, N-70)

Examples 26 and 30

Laminated films were obtained in the same manner as that in Example 25, except for changing the proportions of the polyesters C and D constituting the coating layer as shown in Table 8. The obtained properties are shown in Table 8.

Examples 27, 28, 31 and 32

Laminated films were obtained in the same manner as that in Example 26, except for changing the thickness of the coating layer as shown in Table 8. The obtained properties are shown in Table 8.

Example 29

A laminated film was obtained in the same manner as that in Example 26, except for changing the structure and production condition of the polyester film onto which the coating layer was applied to those in Film 2 as shown in Table 7. The obtained properties are shown in Table 8.

TABLE 7

|  |  |  |  | Film 1 | Film 2 |
|---|---|---|---|---|---|
| Film production condition | Protective layer portion |  | Resin | PEN | PEN |
|  |  |  | Layer number | 2 | 2 |
|  |  |  | Tg (° C.) | 120 | 120 |
|  | Laminated layer portion | First layer | Resin | PEN | PEN |
|  |  |  | Layer number | 90 | 70 |
|  |  | Second layer | Resin | IA12PET | TA44PEN |
|  |  |  | Layer number | 91 | 71 |
|  |  |  | Total layer number | 181 | 141 |
|  | Stretch ratio |  | MD Times | 4.5 | 4.5 |
|  |  |  | TD Times | 4.5 | 4.5 |
|  | Heat set |  | Temperature ° C. | 204 | 220 |
| Film layer structure | Total thickness |  | μm | 46 | 28 |
|  | Protective layer | Thickness | Surface A μm | 10 | 3 |
|  |  |  | Surface D μm | 10 | 3 |
|  | Laminated structure portion | Minimum thickness | First layer nm | 114 | 114 |
|  |  |  | Second layer nm | 127 | 127 |
|  |  | Maximum thickness | First layer nm | 171 | 171 |
|  |  |  | Second layer nm | 190 | 190 |
|  |  |  | Thickness μm | 26 | 22 |

TABLE 8

| Item | | | | Example 25 | Example 26 | Example 27 | Example 28 | Example 29 | Example 30 | Example 31 | Example 32 |
|---|---|---|---|---|---|---|---|---|---|---|---|
| Coating layer | Coating agent | Composition ratio (% by weight) | Polyester C | 21.2 | 42.25 | 42.25 | 42.25 | 42.25 | 59.2 | 42.25 | 42.25 |
|  |  |  | Polyester D | 63.3 | 42.25 | 42.25 | 42.25 | 42.25 | 25.3 | 42.25 | 42.25 |
|  |  |  | Acrylic resin | 5 | 5 | 5 | 5 | 5 | 5 | 5 | 5 |
|  |  |  | Organic particle | 0.5 | 0.5 | 0.5 | 0.5 | 0.5 | 0.5 | 0.5 | 0.5 |
|  |  |  | Surfactant | 10 | 10 | 10 | 10 | 10 | 10 | 10 | 10 |
|  |  | Ratio of polyester (% by weight) | Polyester C | 25.1 | 50 | 50 | 50 | 50 | 70 | 50 | 50 |
|  |  |  | Polyester D | 74.9 | 50 | 50 | 50 | 50 | 30 | 50 | 50 |
| Biaxially stretched multilayer laminated film | Type of laminated film | | | Film 1 | Film 1 | Film 1 | Film 1 | Film 2 | Film 1 | Film 1 | Film 1 |
|  | Refractive index of coating layer | | | 1.63 | 1.61 | 1.61 | 1.61 | 1.61 | 1.59 | 1.61 | 1.61 |
|  | Thickness of coating layer | | μm | 0.08 | 0.08 | 0.05 | 0.20 | 0.08 | 0.08 | 0.03 | 0.25 |
|  | Haze value | | % | 1.70 | 1.70 | 1.40 | 3.10 | 1.20 | 1.70 | 1.10 | 3.60 |
|  | Average reflectance at 400 to 750 nm | | % | 16 | 16 | 16 | 16 | 15 | 16 | 16 | 16 |
|  | Average reflectance at 800 to 1,200 nm | | % | 55 | 55 | 55 | 55 | 54 | 55 | 55 | 55 |
|  | Young's modulus (at 90° C.), MD | | MPa | 2.9 | 2.9 | 2.9 | 2.9 | 2.4 | 2.9 | 2.9 | 2.9 |
|  | Young's modulus (at 90° C.), TD | | MPa | 2.9 | 2.9 | 2.9 | 2.9 | 2.4 | 2.9 | 2.9 | 2.9 |
| Laminated glass | Appearance (planar sheet) | | Evaluation of processability into a laminated glass (i) | ○ | ○ | ○ | ○ | ○ | ○ | ○ | ○ |
|  |  | | Evaluation of processability into a laminated glass (ii) | ○ | ○ | ○ | ○ | ○ | X | X | X |

Example 33

Polyethylene-2,6-naphthalate (PEN) having an intrinsic viscosity (in orthochlorophenol at 35° C.) of 0.62 dL/g as a polyester serving for not only a first layer but an outermost layer (protective layer) and isophthalic acid-copolymerized polyethylene terephthalate having 12% by mole of isophthalic acid copolymerized therewith (IA12PET) and having an intrinsic viscosity (in orthochlorophenol at 35° C.) of 0.65 dL/g as a polyester serving for a second layer were prepared, respectively.

Then, the polyester serving for not only the first layer but the protective layer was dried at 180° C. for 5 hours, and the polyester serving for the second layer was dried at 160° C. for 3 hours, and thereafter, the resulting polyesters were supplied into an extruder, respectively. PEN and IA12PET were heated to 300° C. and 280° C. and rendered in a molten state, respectively. The polyester serving for the first layer was branched into 90 layers, and the polyester serving for the second layer was branched into 91 layers; thereafter, these branched layers were laminated by using a multilayer feed block apparatus for laminating a laminated structure portion such that the polyester layer for the first layer and the polyester layer for the second layer were alternately laminated, and a ratio of the maximum layer thickness to the minimum layer thickness in each of the first layer and the second layer continuously changed up to 1.5 times in terms of maximum/minimum and the protective layer on the both surfaces of the laminated structure portion; and the laminate was guided into a die while keeping a laminated state thereof and cast on a casting drum. Then, an unstretched multilayer laminated film having a protective layer composed of a PEN layer on the outermost layer on the both surfaces of the film and a total layer number of the laminated structure portion of 181 layers was fabricated. Incidentally, with respect to the thickness of each of the laminated structure portion and the protective layer, the supply amount was adjusted such that the thickness after stretching became as shown in Table 9.

This unstretched multilayer laminated film was stretched 4.5 times in the film forming direction at a temperature of 150° C. Subsequently, the resultant was supplied into a tenter, stretched 4.5 times in the width direction at a temperature of 155° C., and subsequently subjected to a heat set treatment at 235° C. for 3 seconds. The properties of the resulting biaxially stretched laminated polyester film (Film 3) are shown in Tables 9 and 11.

On one surface of the resulting biaxially stretched laminated polyester film, titanium oxide ($TiO_2$, refractive index 2.2) and silicon dioxide ($SiO_2$, refractive index: 1.5) were formed in a constitution of Laminate 1 shown in Table 10 by a sputtering method. The properties of the resulting infrared light shielding structure are shown in Table 11.

In the infrared light shielding structure of the present Example, the interference between the laminates in a visible light wavelength range at 400 to 750 nm was cancelled, and as a result, the average reflectance in the foregoing wavelength range was extremely low as 22%, and a high visible light transmittance was obtained. Furthermore, nevertheless high transmittance properties in a visible light region were revealed, high reflectance properties in an infrared wavelength region were provided, and the solar transmittance became high in proportion to an increase of the transmittance to a visible light as compared with Example 36 in which the thickness of the protective layer is thin.

In addition, in the case of using the resulting film for a laminated glass of a windshield, high visibility and high heat ray shielding properties were obtained.

Example 34

The same operation as that in Example 33 was repeated, except that silver (Ag, refractive index: 0.17) and indium oxide ($In_2O_3$, refractive index: 1.9) were formed in a constitution of Laminate 2 shown in Table 10 as the metal/metal oxide laminate by a sputtering method in place of $TiO_2$ and $SiO_2$. The properties of the resulting infrared light shielding structure are shown in Table 11.

Example 35

The same operation as that in Example 33 was repeated, except that silver (Ag) and indium oxide ($In_2O_3$) were formed in a constitution of Laminate 3 shown in Table 10 as the metal/metal oxide laminate by a sputtering method in place of $TiO_2$ and $SiO_2$. The properties of the resulting infrared light shielding structure are shown in Table 11.

Examples 36 to 38

The same operation as that in Example 33 was repeated, except that Film 4 prepared by repeating the same operation as that in Example 33, except for changing the thickness of the protective layer of the biaxially stretched laminated polyester film to 3 μm, was used as the biaxially stretched laminated polyester film, and the type of the metal/metal oxide laminate was changed as shown in Table 11. The properties of each of the resulting infrared light shielding structures are shown in Table 11.

Example 39

The same operation as that in Example 33 was repeated, except for not forming the metal/metal oxide laminate. The properties of the resulting infrared light shielding structure are shown in Table 11.

Comparative Example 9

A polyethylene terephthalate film having a thickness of 50 μm was used in place of the biaxially stretched laminated polyester film, and the metal/metal oxide having the structure of Laminate 1 shown in Table 10 was formed on one surface thereof in the same method as that in Example 33. The properties of the resulting infrared light shielding structure are shown in Table 11.

TABLE 9

| | | | | | Film 3 | Film 4 |
|---|---|---|---|---|---|---|
| Film production condition | Outermost layer portion | | Resin | | PEN | PEN |
| | | | Layer number | | 2 | 2 |
| | | | Glass transition temperature (Tg) (° C.) | | 120 | 120 |
| | Laminated structure portion | First layer | Resin | | PEN | PEN |
| | | | Layer number | | 90 | 90 |
| | | Second layer | Resin | | IA12PET | IA12PET |
| | | | Layer number | | 91 | 91 |
| | | | Total layer number | | 181 | 181 |
| | Stretch ratio | | MD | Times | 4.5 | 4.5 |
| | | | TD | Times | 4.5 | 4.5 |
| | Heat set | | Temperature | ° C. | 235 | 235 |
| Film layer structure | Total thickness | | | μm | 46 | 32 |
| | Outermost layer | Thickness | Surface on the metal layer side | μm | 10 | 3 |
| | | | Opposite surface to the metal layer side | μm | 10 | 3 |
| | Laminated structure | Minimum thickness | First layer | nm | 114 | 114 |
| | | | Second layer | nm | 127 | 127 |

TABLE 9-continued

|  |  |  |  | Film 3 | Film 4 |
|---|---|---|---|---|---|
| | portion | Maximum thickness | First layer (nm) | 171 | 171 |
| | | | Second layer (nm) | 190 | 190 |
| | | Thickness | (μm) | 26 | 26 |
| Film properties | DSC measurement | Tg of second layer polymer | °C. | 78 | 78 |
| | | Tg of first layer polymer | °C. | 120 | 120 |
| | Dynamic viscoelasticity | Tg of second layer polymer | °C. | 78 | 78 |
| | | Tg of first layer polymer | °C. | 149 | 149 |

TABLE 10

| Order of layer | Laminate 1 | | Laminate 2 | | Laminate 3 | |
|---|---|---|---|---|---|---|
| | Material quality | Thickness (nm) | Material quality | Thickness (nm) | Material quality | Thickness (nm) |
| 1 | TiO$_2$ | 152 | In$_2$O$_3$ | 1.5 | In$_2$O$_3$ | 35 |
| 2 | SiO$_2$ | 33 | Ag | 12 | Ag | 10 |
| 3 | TiO$_2$ | 22 | In$_2$O$_3$ | 1.5 | In$_2$O$_3$ | 70 |
| 4 | SiO$_2$ | 233 | (Film side) | | Ag | 11 |
| 5 | TiO$_2$ | 22 | | | In$_2$O$_3$ | 70 |
| 6 | SiO$_2$ | 33 | | | Ag | 10 |
| 7 | TiO$_2$ | 142 | | | In$_2$O$_3$ | 35 |
| 8 | SiO$_2$ | 31 | | | (Film side) | |
| 9 | TiO$_2$ | 20 | | | | |
| 10 | SiO$_2$ | 218 | | | | |
| 11 | TiO$_2$ | 20 | | | | |
| 12 | SiO$_2$ | 31 | | | | |
| 13 | TiO$_2$ | 132 | | | | |
| 14 | SiO$_2$ | 29 | | | | |
| 15 | TiO$_2$ | 19 | | | | |
| 16 | SiO$_2$ | 202 | | | | |
| 17 | TiO$_2$ | 19 | | | | |
| 18 | SiO$_2$ | 29 | | | | |
| 19 | TiO$_2$ | 122 | | | | |
| 20 | SiO$_2$ | 27 | | | | |
| 21 | TiO$_2$ | 17 | | | | |
| 22 | SiO$_2$ | 187 | | | | |
| 23 | TiO$_2$ | 17 | | | | |
| 24 | SiO$_2$ | 27 | | | | |
| 25 | TiO$_2$ | 112 | | | | |
| 26 | SiO$_2$ | 24 | | | | |
| 27 | TiO$_2$ | 16 | | | | |
| 28 | SiO$_2$ | 171 | | | | |
| 29 | TiO$_2$ | 16 | | | | |
| 30 | SiO$_2$ | 24 | | | | |
| | (Film side) | | | | | |

INDUSTRIAL APPLICABILITY

Since the biaxially stretched laminated polyester film of the present invention has both a high near-infrared shielding performance and excellent processability into a laminated glass, it is possible to provide a laminated glass having excellent appearance and high near-infrared shielding performance.

The invention claimed is:

1. A biaxially stretched laminated polyester film comprising 51 layers or more in total, in which a first layer and a second layer are alternately laminated, which is characterized in that a polyester (A) constituting the first layer is polyethylene-2,6-naphthalenedicarboxylate; a polyester (B) constituting the second layer is a polyester containing at least one of an ethylene terephthalate component and an ethylene naphthalene dicarboxylate component; an average reflectance within a wavelength range of 400 to 750 nm is not more than 25%; an average reflectance within a wavelength range of 800 to 1,200 nm is 50% or more; and a Young's modulus of the film at 90° C. is 2,400 MPa or more in at least one direction of the longitudinal direction and the lateral direction of the film,
    wherein the biaxially stretched laminated polyester film has a single-layered protective layer composed of a polymer having a glass transition temperature of 90° C. or higher and having a thickness of 5 μm or more and not more than 20 μm on both sides of a laminated structure portion (I) in which the first layer and the second layer are alternately laminated,
    wherein the single-layered protective layer and the laminated structure portion (I) are directly attached,

TABLE 11

| Item | | | Example 33 | Example 34 | Example 35 | Example 36 | Example 37 | Example 38 | Example 39 | Comparative Example 9 |
|---|---|---|---|---|---|---|---|---|---|---|
| Infrared light shielding structure | Biaxially stretched laminated polyester film | | Film 3 | Film 3 | Film 3 | Film 4 | Film 4 | Film 4 | Film 3 | PET |
| | Metal/metal oxide laminate | | Laminate 1 | Laminate 2 | Laminate 3 | Laminate 1 | Laminate 2 | Laminate 3 | No | Laminate 1 |
| Biaxially stretched laminated polyester film | Average reflectance (%) | 400 to 750 nm | 17 | 17 | 17 | 17 | 17 | 17 | 17 | 13 |
| | | 800 to 1,200 nm | 77 | 77 | 77 | 77 | 77 | 77 | 77 | 13 |
| | Young's modulus (at 90° C.), MD | MPa | 3.0 | 3.0 | 3.0 | 2.4 | 2.4 | 2.4 | 3.0 | 3.3 |
| | Young's modulus (at 90° C.), TD | MPa | 3.0 | 3.0 | 3.0 | 2.4 | 2.4 | 2.4 | 3.0 | 3.5 |
| | Evaluation of processability into a laminated glass (i) (planar sheet) | | ○ | ○ | ○ | ○ | ○ | ○ | ○ | ○ |
| Properties of infrared light shielding structure | Average reflectance (%) | 400 to 750 nm | 22 | 24 | 20 | 35 | 39 | 31 | 17 | 22 |
| | | 800 to 1,200 nm | 77 | 84 | 87 | 77 | 84 | 87 | 77 | 28 |
| | | 1,200 to 2,100 nm | 75 | 82 | 87 | 75 | 82 | 87 | 14 | 69 |
| | Solar transmittance (%) | | 52 | 48 | 49 | 46 | 40 | 43 | 63 | 69 | wherein the polymer of the protective layer includes polyethylene naphthalate, polystyrene, polyphenylene sulfide, polyether sulfone, or polyphenylene oxide.

2. The biaxially stretched laminated polyester film according to claim 1, wherein the polyester (B) constituting the second layer is a polyester containing 50% by mole or more and not more than 95% by mole of an ethylene terephthalate component on the basis of the whole recurring units.

3. The biaxially stretched laminated polyester film according to claim 2, wherein the polyester (B) constituting the second layer is copolymerized polyethylene terephthalate having a glass transition temperature of lower than 90° C.

4. The biaxially stretched laminated polyester film according to claim 1, wherein the polyester (B) constituting the second layer is copolymerized polyethylene terephthalate having a glass transition temperature of lower than 90° C.

5. The biaxially stretched laminated polyester film according to claim 1, wherein the polyester (B) constituting the second layer is a polyester having a glass transition temperature of 90° C. or higher.

6. The biaxially stretched laminated polyester film according to claim 5, wherein the polyester (B) constituting the second layer is a polyester containing 30% by mole or more and not more than 90% by mole of an ethylene naphthalene dicarboxylate component on the basis of the whole recurring units.

7. The biaxially stretched laminated polyester film according to claim 1, wherein the polyester (A) constituting the first layer is polyethylene-2,6-naphthalenedicaboxylate having a copolymerization amount of not more than 8% by mole on the basis of the whole recurring units.

8. The biaxially stretched laminated polyester film according to claim 1, having at least one layer containing an ultraviolet light absorber.

9. The biaxially stretched laminated polyester film according to claim 8, wherein the ultraviolet light absorber has an extinction coefficient ε at a wavelength of 380 nm of 2 or more.

10. The biaxially stretched laminated polyester film according to claim 9, wherein an average light transmittance within a wavelength range of 300 nm or more and less than 400 nm is not more than 10%.

11. The biaxially stretched laminated polyester film according to claim 8, wherein an average light transmittance within a wavelength range of 300 nm or more and less than 400 nm is not more than 10%.

12. The biaxially stretched laminated polyester film according to claim 1, which is used for shielding of heat rays.

13. The biaxially stretched laminated polyester film according to claim 1, which is used for laminated glass.

14. The biaxially stretched laminated polyester film according to claim 1, wherein a coating layer having a refractive index of 1.60 to 1.63 and a thickness of 0.05 to 0.2 is provided on at least one surface of the biaxially stretched laminated polyester film having the laminated structure portion (I).

15. An infrared light shielding structure for laminated glass comprising the biaxially stretched laminated polyester film according to claim 1 having a laminate of a metal and/or a metal oxide laminated on one surface thereof, wherein in the biaxially stretched laminated polyester film, a thickness of the protective layer on the side coming into contact with the laminate of a metal and/or a metal oxide is 5 μm or more and not more than 20 μm; the laminate of a metal and/or a metal oxide has a laminated structure (II) in which a low-refractive index layer and a high-refractive index layer are alternately laminated; and the infrared light shielding structure for laminated glass has an average reflectance in a wavelength range of 400 to 750 nm of not more than 30%, an average reflectance in a wavelength range of 800 to 1,200 nm of 50% or more, and an average reflectance in a wavelength range of 1,200 to 2,100 nm of 50% or more.

16. A laminated glass comprising two glass sheets having the infrared light shielding structure for laminated glass according to claim 15 sandwiched therebetween via a resin layer composed of at least one member selected from an ethylene-vinyl acetate copolymer, polyvinyl butyral, and an ionomer resin.

17. A laminated glass comprising two glass sheets having the biaxially stretched laminated polyester film according to claim 1 sandwiched therebetween via a resin layer composed of at least one member selected from an ethylene-vinyl acetate copolymer, polyvinyl butyral, and an ionomer resin.

18. The biaxially stretched laminated polyester film according to claim 1, wherein the polymer of the protective layer is polyethylene-2,6-naphthalate which is the same as a polymer of the first layer.

19. The biaxially stretched laminated polyester film according to claim 1, wherein the protective layer consists of the polymer having a glass transition temperature of 90° C. or higher.

* * * * *